(12) United States Patent
Shi et al.

(10) Patent No.: US 11,885,141 B2
(45) Date of Patent: Jan. 30, 2024

(54) SENSORY FLOORING SYSTEM AND A SENSORY FLOOR COMPRISING A SENSORY FLOORING SYSTEM

(71) Applicant: National University of Singapore, Singapore (SG)

(72) Inventors: Qiongfeng Shi, Singapore (SG); Chengkuo Lee, Singapore (SG)

(73) Assignee: National University of Singapore, Singapore (SG)

( * ) Notice: Subject to any disclaimer, the term of this patent is extended or adjusted under 35 U.S.C. 154(b) by 0 days.

(21) Appl. No.: 17/642,579

(22) PCT Filed: Oct. 10, 2020

(86) PCT No.: PCT/SG2020/050580
§ 371 (c)(1),
(2) Date: Mar. 11, 2022

(87) PCT Pub. No.: WO2021/071436
PCT Pub. Date: Apr. 15, 2021

(65) Prior Publication Data
US 2022/0341188 A1 Oct. 27, 2022

(30) Foreign Application Priority Data
Oct. 10, 2019 (SG) .......................... 10201909482Q

(51) Int. Cl.
*E04F 15/024* (2006.01)
*E04F 15/02* (2006.01)
(Continued)

(52) U.S. Cl.
CPC .. *E04F 15/02177* (2013.01); *E04F 15/02405* (2013.01); *E04F 15/107* (2013.01); *F21S 8/022* (2013.01); *G06F 3/011* (2013.01)

(58) Field of Classification Search
CPC .......... E04F 15/02177; E04F 15/02405; E04F 15/107; G06F 3/011; F21S 8/022
(Continued)

(56) References Cited

U.S. PATENT DOCUMENTS 8,217,763 B2 * 7/2012 Elferich ............... H05B 47/115
340/10.5
10,477,355 B1 * 11/2019 Niranjayan ........... A61B 5/1113
(Continued)

FOREIGN PATENT DOCUMENTS

CN 102354374 A 2/2012

OTHER PUBLICATIONS

The International Search Report and The Written Opinion for PCT/SG2020/050580, dated Jan. 20, 2021, pp. 8.
(Continued)

*Primary Examiner* — Brent W Herring
(74) *Attorney, Agent, or Firm* — Botos Churchill IP Law LLP

(57) ABSTRACT

Disclosed is a sensory flooring system. The flooring system comprises a plurality of flooring segments and, for each flooring segment, one or more electrode portions. Each electrode portion is responsive to a force applied to the flooring segment and at least one electrode portion of a said flooring segment forms an electrode with at least one electrode portion of another said flooring segment. Moreover, each flooring segment comprises a unique encoding of the one or more electrode portions. Also disclosed is a sensory floor such a sensory flooring system, a receiver for receiving an electrical output from the one or more electrodes formed by said one or more electrode portions of the flooring segments, and a processor for analysing the electrical output and identifying the flooring segment by which the electrical output was produced.

20 Claims, 18 Drawing Sheets

(51) Int. Cl.
*E04F 15/10* (2006.01)
*F21S 8/02* (2006.01)
*G06F 3/01* (2006.01)

(58) Field of Classification Search
USPC .................. 52/28; 362/153; 340/815.4, 666
See application file for complete search history.

(56) References Cited

U.S. PATENT DOCUMENTS

| | | | |
|---|---|---|---|
| 2007/0171058 A1* | 7/2007 | Knowles | G08B 13/10 |
| | | | 340/687 |
| 2008/0048880 A1* | 2/2008 | Strickland | G06F 3/0488 |
| | | | 340/815.4 |
| 2010/0052866 A1* | 3/2010 | Elferich | H05B 47/19 |
| | | | 340/10.5 |
| 2018/0268220 A1* | 9/2018 | Lee | G06V 20/36 |
| 2022/0098878 A1* | 3/2022 | Holyoake | H05B 47/115 |

OTHER PUBLICATIONS

Shi, et al., "Self-Powered Bio-Inspired Spider-Net-Coding Interface Using Single-Electrode Triboelectric Nanogenerator," Advanced Science, 2019, vol. 6, No. 15, pp. 190617-1-1900617-13.

\* cited by examiner

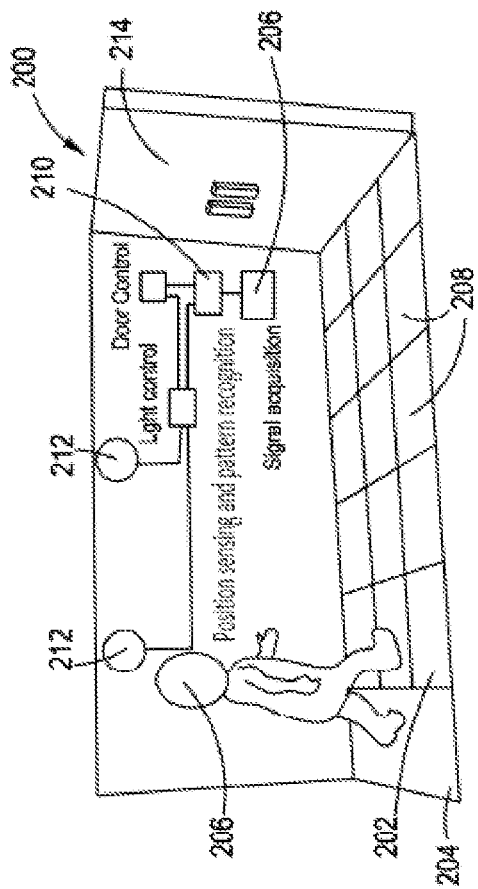
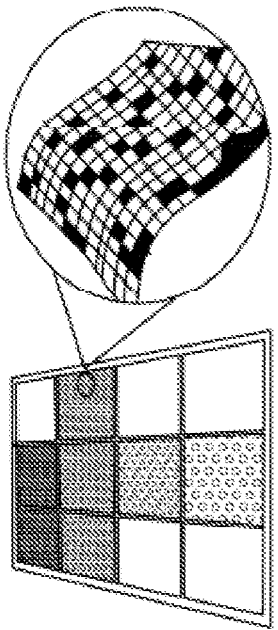
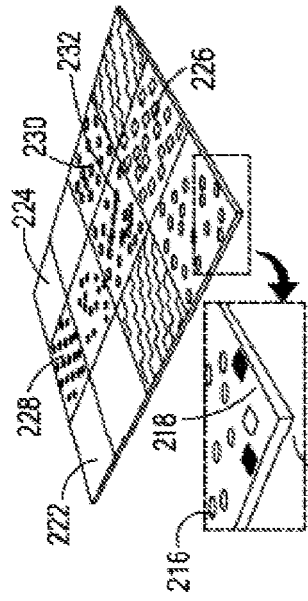
Figure 2a
Figure 2b
Figure 2c

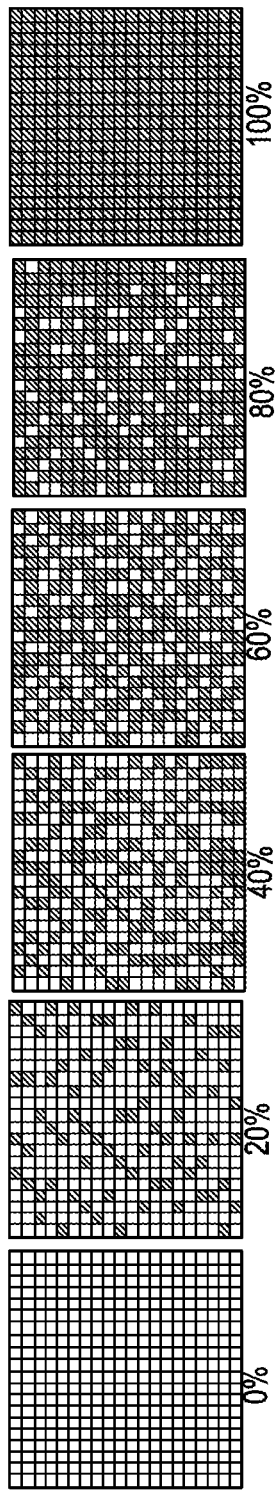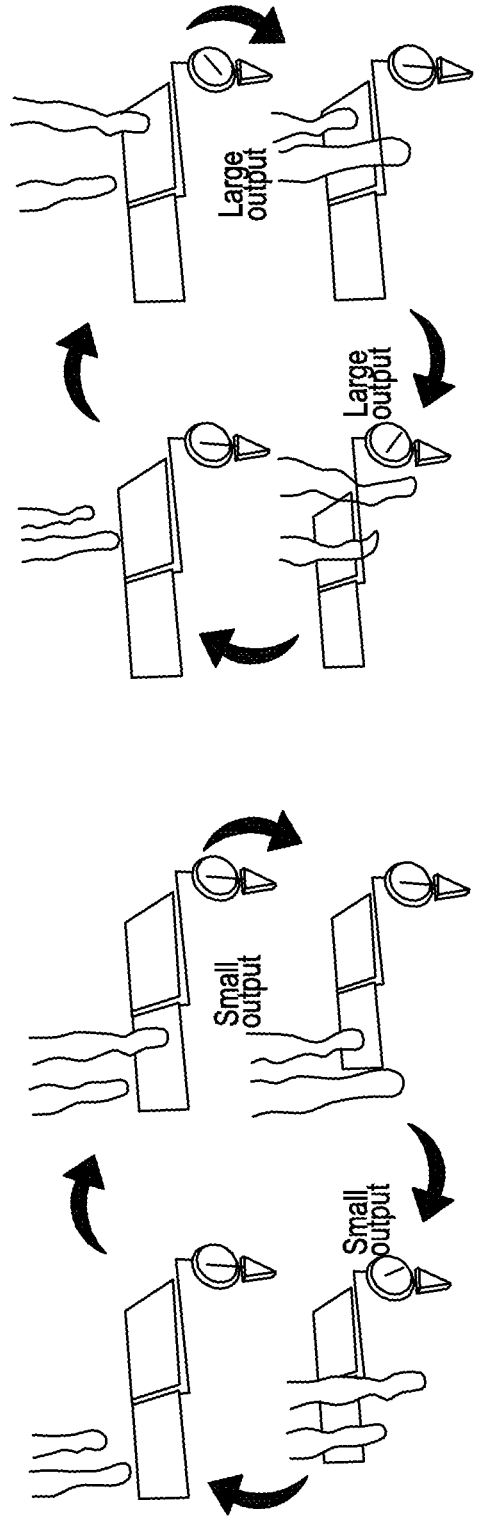

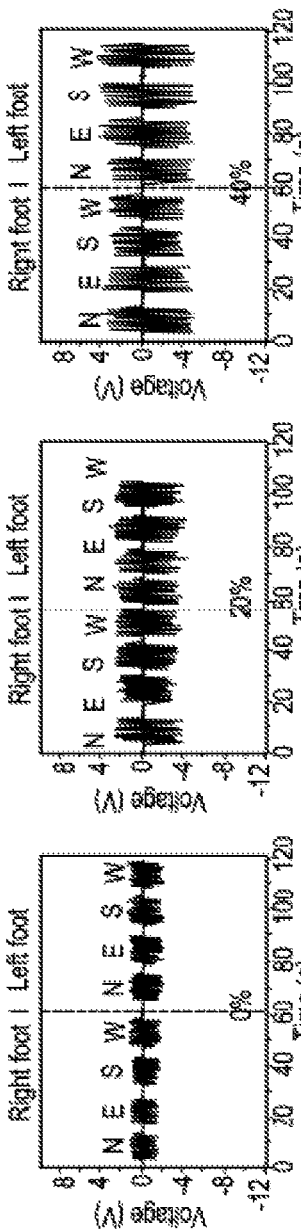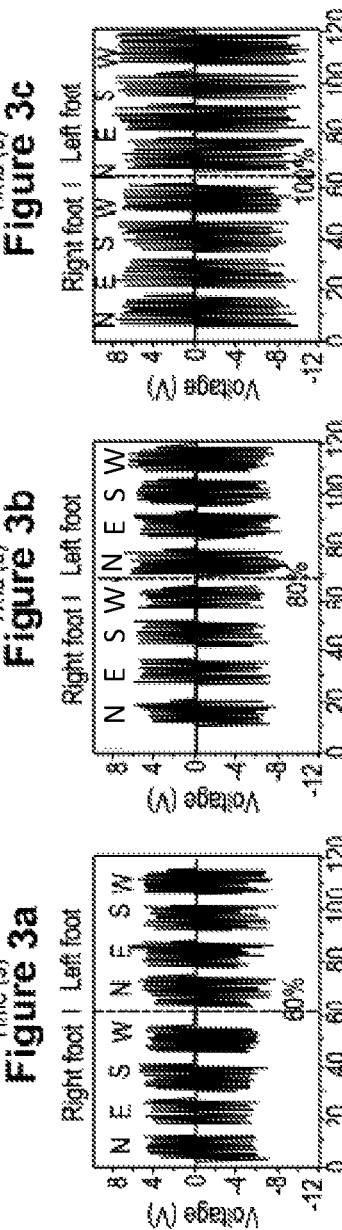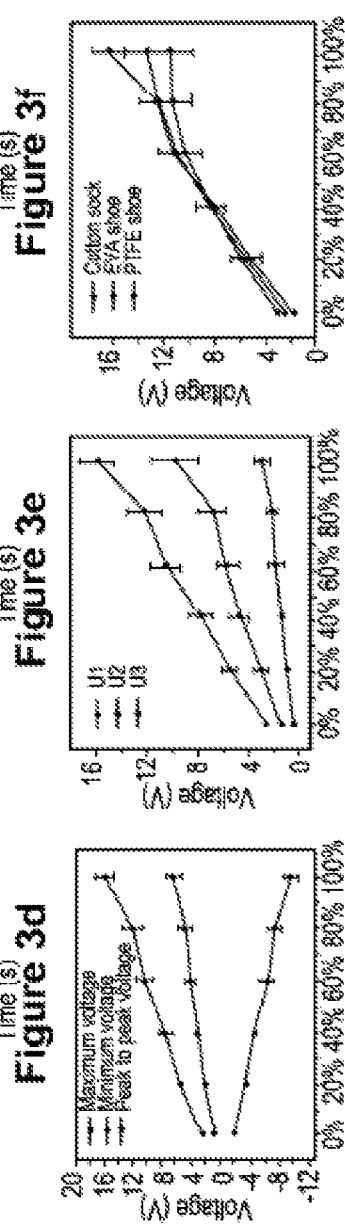

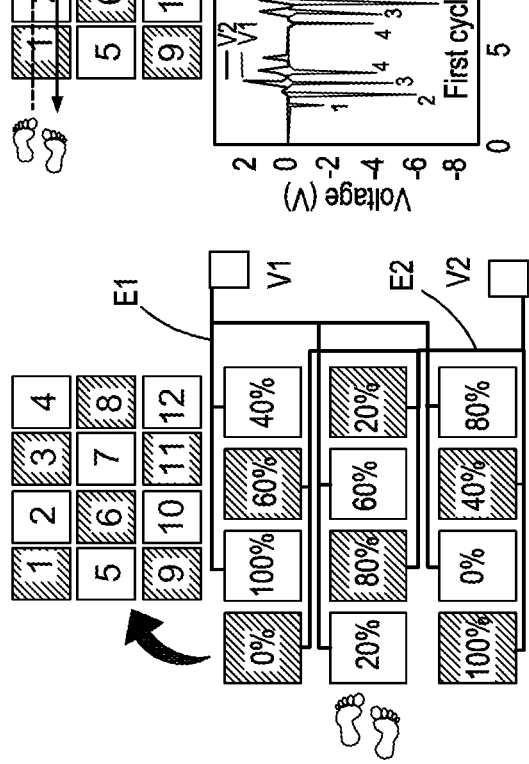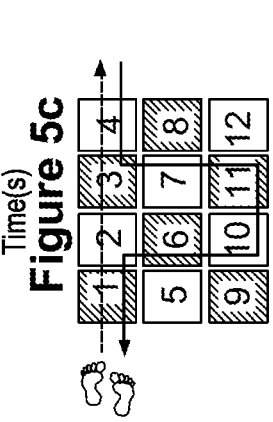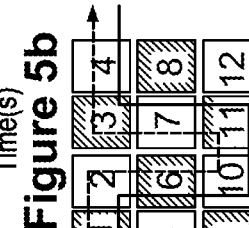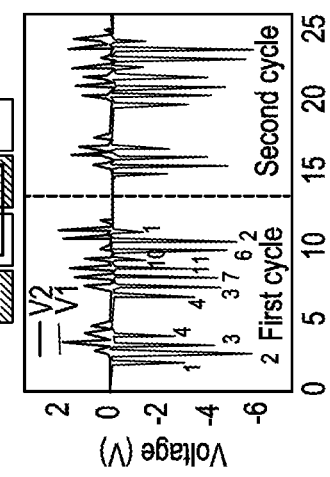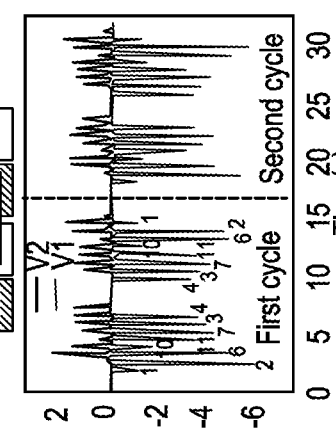

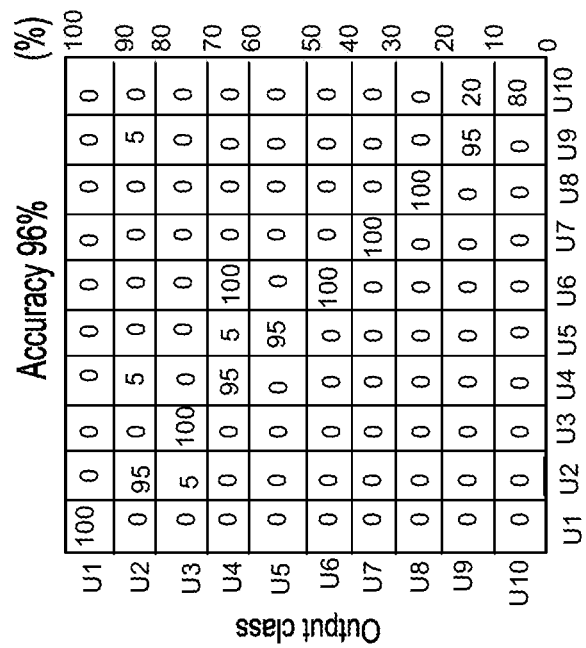
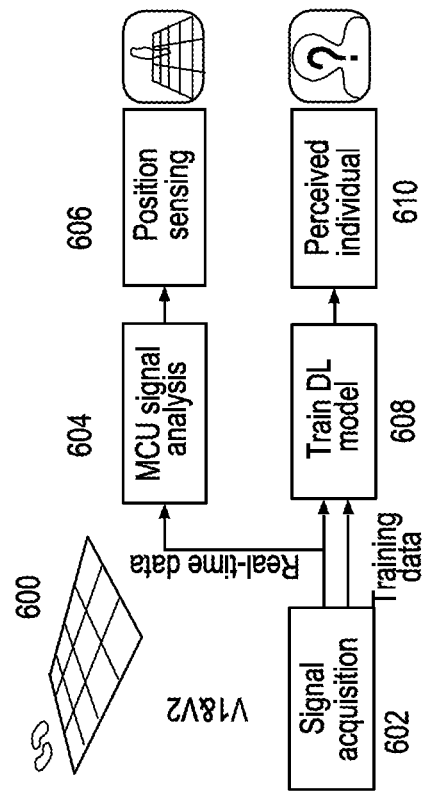
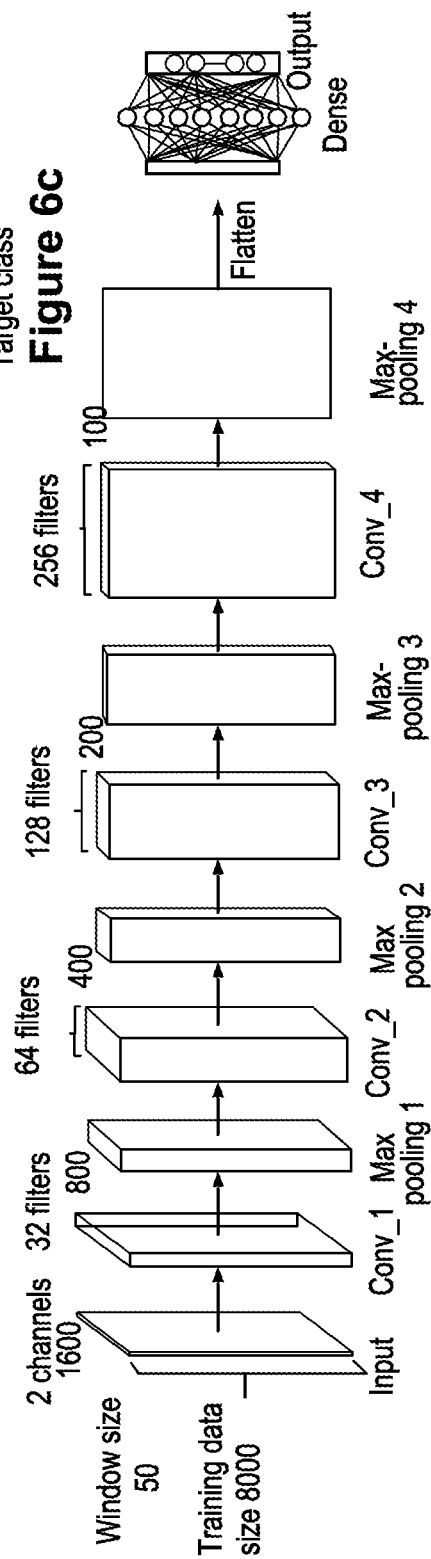
Figure 6a
Figure 6b
Figure 6c

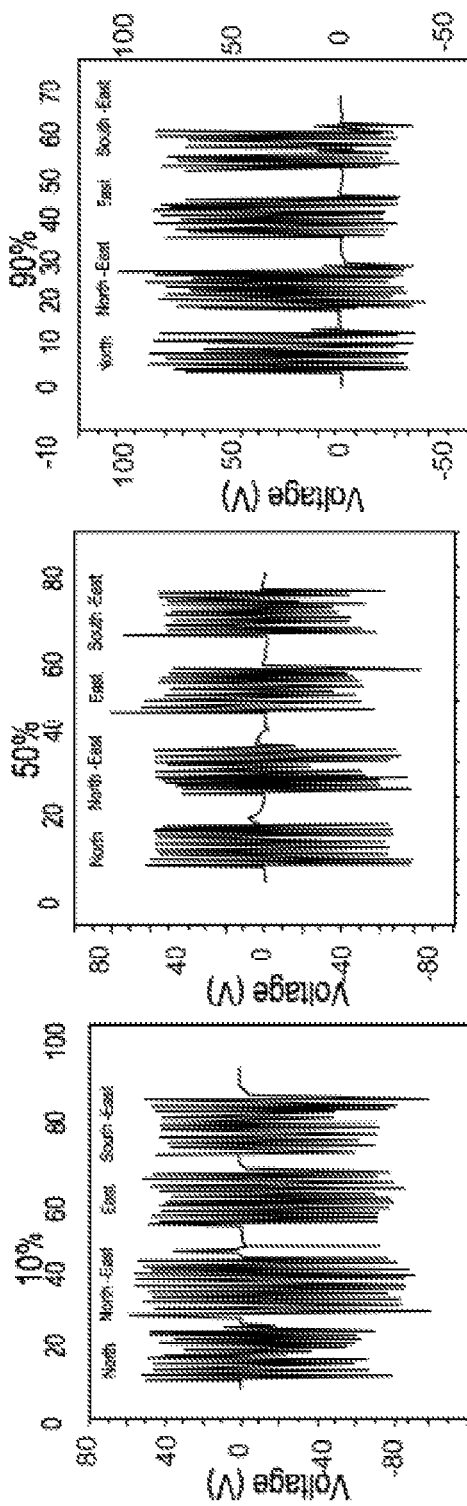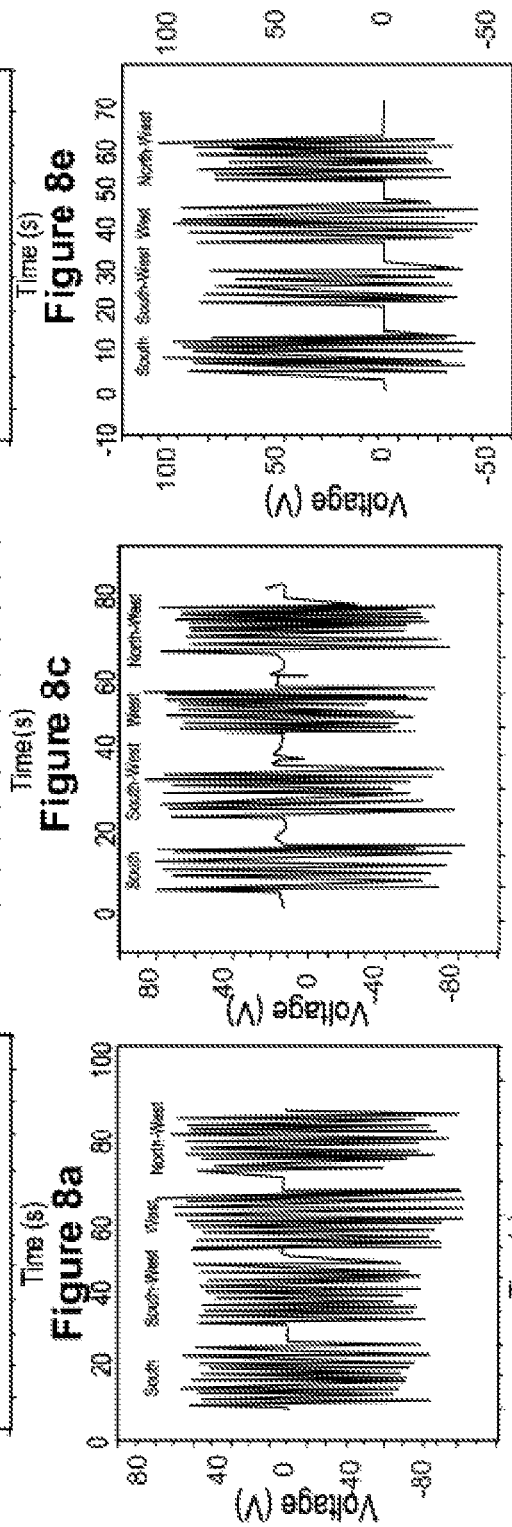
Figure 8a Figure 8b Figure 8c Figure 8d Figure 8e Figure 8f Output of 8 directions (10%)

Output of different percentages

Left comb electrode width w1, right comb electrode width w2; μm to mm range

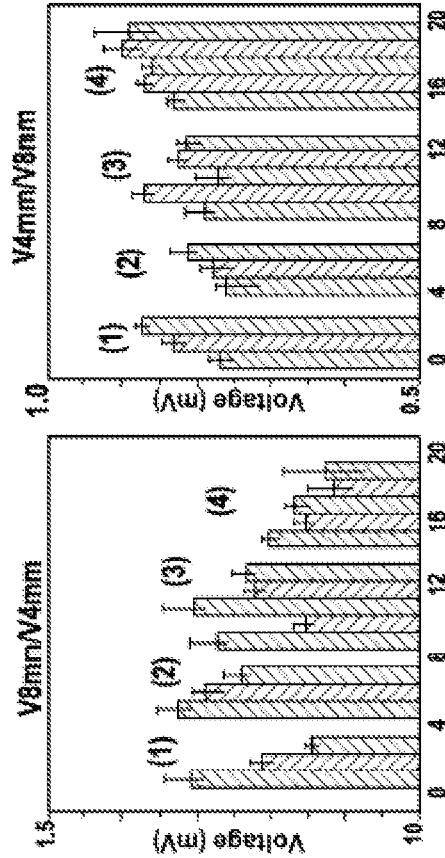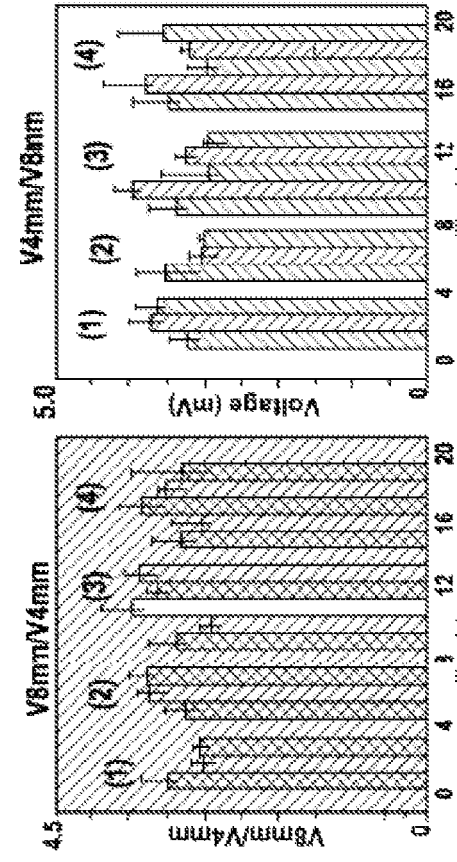

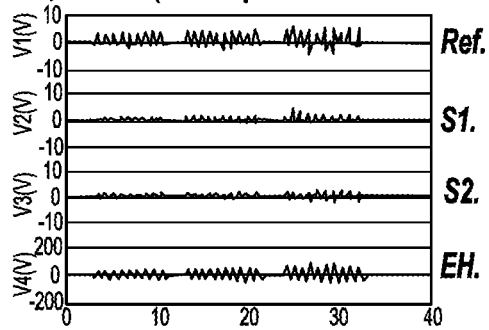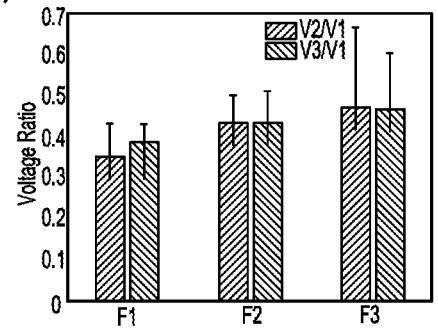
Figure 13a   Figure 13b
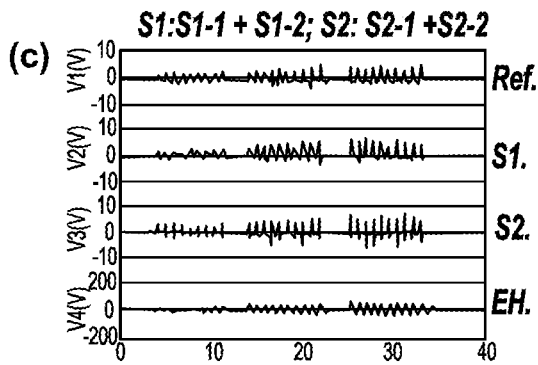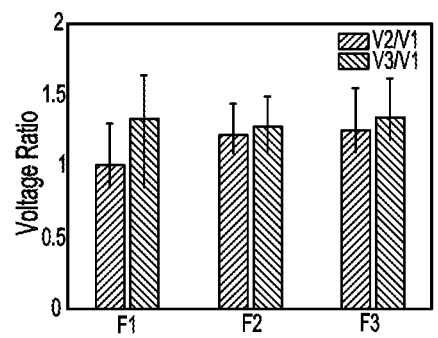
Figure 13c   Figure 13d
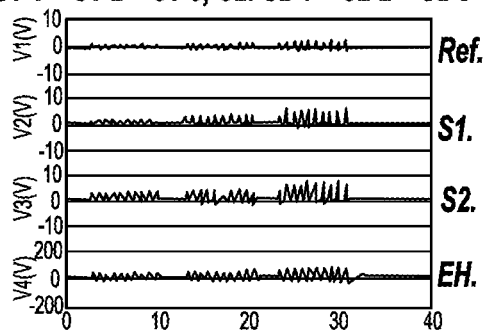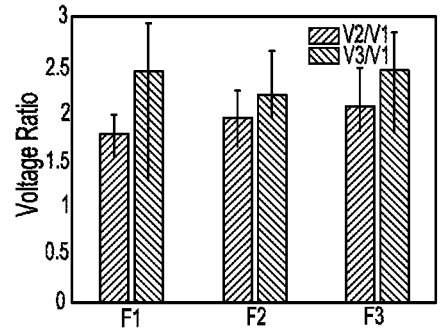
Figure 13e   Figure 13f

SENSORY FLOORING SYSTEM AND A SENSORY FLOOR COMPRISING A SENSORY FLOORING SYSTEM

CROSS-REFERENCE TO RELATED APPLICATIONS

The present application is a national phase entry under 35 U.S.C. § 371 of International Application No. PCT/SG2020/050580, Oct. 10, 2020, published as International Publication No. WO 2021/071436 A1, which claims the benefit of the filing date of Singapore Patent Application No. 10201909482Q filed Oct. 10, 2019, the disclosures of which are hereby incorporated by reference.

TECHNICAL FIELD

The present invention relates, in general terms, to a sensory flooring system and a sensory floor comprising a sensory flooring system. In particular, the present invention relates to, but is not limited to, minimal electrode designs of floor mat monitoring and energy harvesting systems.

BACKGROUND

To respond to the vision of a smart home, smart building or smart nation, it can be useful to incorporate additional functions into existing features of the physical environment. For example, a floor mat can be equipped with advanced sensors for sensing and energy harvesting functions.

Since the area of a floor is normally large, sensory clause typically employ an array of floor mats to achieve sensing goals. In current devices, each sensing pixel of the floor mat array has individual top/bottom electrodes or row/column electrodes to perform the sensing function. For a large array with n×n pixels, the total number of electrodes can be as significant as n, i.e., $2n^2$ or 2n for top/bottom electrode or row/column electrode configurations, respectively. This large number of electrodes can cause significant complexity in the system layout, electrical signal readout and processing.

It would therefore be desirable to provide a sensory flooring system or sensory floor that avoids you large number, and complex layout, of electrodes.

In some security applications, camera surveillance would be desirable but is difficult due to privacy issues. To protect companies from invading peoples' privacy during surveillance activity, and to also protect people from having their privacy invaded during, for example, video capture, optical approaches such as laser beam scanning have been proposed as a potential solution. The sensory information acquired using such approaches is limited and the laser beam is easily blocked by other objects. This results in information loss and inaccurate sensing. Furthermore, the implementation and operation of such a system is highly costly and power consuming. It is therefore at odds with the sustainable development of a smart building/home.

It would therefore be desirable to provide an alternative mechanism to monitor areas for security purposes, by reducing the impact of privacy considerations.

SUMMARY

Disclosed is a sensory flooring system comprising:
a plurality of flooring segments; and
for each flooring segment, one or more electrode portions each electrode portion being responsive to a force applied to the flooring segment,
wherein at least one electrode portion of a said flooring segment forms an electrode with at least one electrode portion of another said flooring segment, and
wherein each flooring segment comprises a unique encoding of the one or more electrode portions.

The term "encoding" as used herein may refer to physical encoding such as using various interdigitation schema, spatial encoding such as using variations in grid pixel coverage, connectivity encoding comprising connecting different sensors together, and others.

Each electrode portion of each flooring segment may be electrically connected with at least one electrode portion of another said flooring segment, to form an electrode. Electrode portions that are connected may be of a common type. The common type may be one or more of a pressure sensor and energy harvester.

For each common type, all electrode portions for all flooring segments are connected to form a single electrode. In other words, all electrode portions of the same types may be connected to form a single electrode.

Each flooring segment may be uniquely encoded by the one or more electrode portions of each flooring segment covering a unique proportion of an area of the flooring segment. The unique proportion may comprise a percentage of the area of the flooring segment. The proportion of the area of the flooring segment may be randomly covered by the one or more electrode portions.

Each flooring segment may be uniquely encoded by:
the one or more electrode portions of the flooring segment covering a unique proportion of an area of the flooring segment; and
a material from which at least one of the electrode portions of the flooring segment differing from a material of at least one of the electrode portions of another flooring segment.

Each flooring segment may comprise two or more electrode portions and be uniquely encoded by having a specific ratio of power outputs of the two or more electrode portions when a force is applied to the flooring segment. Each flooring segment may comprise two electrode portions. The electrode portions of each flooring segment may be interdigital or interdigitated. A width of the two or more electrode portions may be selected to optimise consistency of the specific ratio. For example, the width may be selectively kept small, so the direction of application of a force (e.g. by a user), or the consistent foot fall area (for example) does not in substance impact on the ratio.

The two or more electrode portions may be sensing electrode portions.

Each flooring segment may comprise at least one sensing electrode portion and at least one reference electrode portion, and be uniquely encoded by a specific ratio of a power output of the at least one sensing electrode portion when compared with a power output of the at least one reference electrode portion, on application of a force to the flooring segment. The at least one sensing electrode portion may comprise a first sensor having two or more sensing electrode portions and, for each flooring segment, a different combination of the two or more sensing electrode portions is electrically connected, and electrode portions that are not electrically connected are redundant. The at least one sensing electrode portion may instead, or in addition, comprise a first sensor and a second sensor each said sensor comprising one or more sensing electrode portions and, for each flooring segment, a different combination of the two or more sensing electrode portions is electrically connected, and electrode portions that are not electrically connected are redundant.

Each flooring segment may further comprise at least one energy harvesting electrode.

Also disclosed herein is a sensory floor comprising:
a sensory flooring system as described above;
a receiver for receiving an electrical output from the one or more electrodes formed by said one or more electrode portions of the flooring segments; and
a processor for analysing the electrical output and identifying the flooring segment by which the electrical output was produced.

The sensory floor may further comprise at least one environment sensor for determining at least one environmental condition around the sensory floor, the processor being configured to adjust analysis of the electrical output based on a signal from the at least one environment sensor.

The processor may be configured to detect a pattern of at least one of a magnitude of the electrical output and a sequence of flooring segments producing the electrical output. The processor may be further configured to identify a person based on the pattern. E.g. the processor may uniquely identify the particular person based on their electrical output. The processor may comprise a neural network configured to detect, based on features extracted from an output of each respective electrode, features corresponding to the particular person. The neural network may be trained based on data obtained from a plurality of trials in which one or more people cross the sensory floor.

The processor may be configured to identify, from a magnitude of the electrical output, a particular position of a person on the sensory floor.

Advantageously, some embodiments enable falls to be detected—e.g. embodiments where the position of the person on the sensory floor is detectable.

Advantageously, systems disclosed herein use triboelectric materials, enabling signals in the electrodes to be self-generated, and availing manufacturers and users of a wide material selection.

Advantageously, the systems disclosed herein have few electrodes. This increases the ease of manufacture when compared with systems having a large number of electrodes.

Advantageously, the present systems can be thin. This enables them to be flexible and readily attached to the floor.

Advantageously, embodiments of the invention are capable of being screen printed. Accordingly, they can be fabricated for application over a large area.

BRIEF DESCRIPTION OF THE DRAWINGS

Embodiments of the present invention will now be described, by way of non-limiting example, with reference to the drawings in which:

FIG. 2a is a conceptual diagram of a smart floor monitoring system and potential applications of position sensing, activity monitoring, and individual recognition in smart building/home scenarios;

FIG. 2b is a close-up view of an assembled triboelectric DLES-mat array with a 3×4 arrangement;

FIG. 2c illustrates a floor mat array and, inset, an individual floor mat with a 40% electrode coverage rate;

FIG. 2d shows a detailed electrode layouts of flooring segments with different electrode coverage rates;

FIGS. 2e and 2f show the operation mechanism of a parallel-connected floor mat array when a person walks on/off a floor mat with smaller electrode coverage rate (FIG. 2e) and larger electrode coverage rate (FIG. 2f), where the output signals with relatively smaller and higher magnitude are generated, respectively;

FIGS. 3a to 3f show the output performance of the individual DLES-mats having 0% (FIG. 3a), 20% (FIG. 3b), 40% (FIG. 3c), 60% (FIG. 3d), 80% (FIG. 3e), and 100% (FIG. 3f) coverage;

FIG. 3g shows the maximum voltage, minimum voltage, and peak-to-peak voltage derived from FIGS. 3a to 3f—the error bars indicate the standard deviation;

FIG. 3h shows the effect of different users wearing PTFE shoes on the output performance;

FIG. 3i shows the effect of different contact materials worn by the same user on the output peak-to-peak voltage;

FIGS. 4a to 4j involve investigation of electrode connection schema, in which FIG. 4a is a schematic diagram of the parallel connection of 12 DLES-mats into one output electrode, FIGS. 4b to 4e show generated output voltages and corresponding peak-to-peak voltage magnitudes on 1 MΩ(FIGS. 4b and 4c) and a 100 MΩ (FIGS. 4d and 4e) external load with two rounds of forward-backward walking, FIG. 4f is a schematic diagram of the interval parallel connection of all the DLES-mats into two output electrodes, and FIGS. 4g to 4j show the generated output voltages and the corresponding peak-to-peak voltage magnitudes on a 1 MΩ(FIGS. 4g and 4h) and a 100 MΩ (FIGS. 4i and 4j) external load with two rounds of forward-backward walking;

FIGS. 5a to 5g show a DLES-mat array for position/trajectory detection and activity monitoring, in which FIG. 5a is a schematic diagram of the constructed 3×4 DLES-mat array with two output electrodes, FIGS. 5b to 5f show voltages generated during two cycles of forward-backward walking trajectories on the DLES-mat array, FIG. 5g illustrates activity monitoring for slow walking, normal walking, fast walking, running, and jumping, according to the output signal magnitudes and frequencies;

FIGS. 6a to 6f show a smart floor monitoring system (sensory floor) with integrated deep learning-assisted data analytics, in which FIG. 6a is the overall structure and data flow of the smart floor monitoring system for real-time position sensing and individual recognition in smart building/home applications; FIG. 6b is a detailed structure of a convolutional neural network (CNN) training model, FIG. 6c shows the confusion matrix for individual recognition of 10 different users, showing a high accuracy of 96%, and FIGS. 6d to 6f demonstrate different stages in real-time position sensing and individual recognition where the person is at Position 1 (FIG. 6d), Position 2 (FIG. 6e), and Position 3 (FIG. 6f);

FIGS. 8a to 8g illustrate output performance of the grid electrode design of FIG. 7, in which FIGS. 8a and 8b show the output voltages of eight testing directions from 10% floor mat; FIGS. 8c and 8d show the output voltages of eight testing directions from 50% floor mat, FIGS. 8e and 8f show the output voltages of eight testing directions from 90% floor mat, FIG. 8g shows the magnitude comparison of the outputs from eight directions.

FIGS. 10a to 10f show the output performance of an IDT electrode design with left comb electrode of 8 mm and right comb electrode of 4 mm, in which FIG. 10a shows voltages measured with 100 MΩ load from the left and right electrodes, FIG. 10b shows the calculated voltage ratio of V8 mm/V4 mm and FIG. 10c shows the V4 mm/V8 mm under different forces, frequencies, positions and angles, FIG. 10d shows the voltages measured with 1 MΩ load from the left and right electrodes, FIG. 10e shows the calculated voltage ratio of V8 mm/V4 mm and FIG. 10f shows V4 mm/V8 mm under different forces, frequencies, positions and angles, showing a more stable output performance;

FIG. 13 illustrates output performance of a fabricated floor mat with different sensing electrode connections (coding) under 1 MΩ load, the output voltage waveforms from all the electrodes, and voltage ratios of sensing electrodes to reference electrode for different coding of S1: S1-1; S2: S2-1 (FIGS. 13a to 13c), S1: S1-1+S1-2 (FIGS. 13d to 13f) and S2: S2-1+S2-2, and S1: S1-1+S1-2+S1-3 and S2: S2-1+S2-2+S2-3, showing higher variations for different coding.

DETAILED DESCRIPTION

Figure 1:
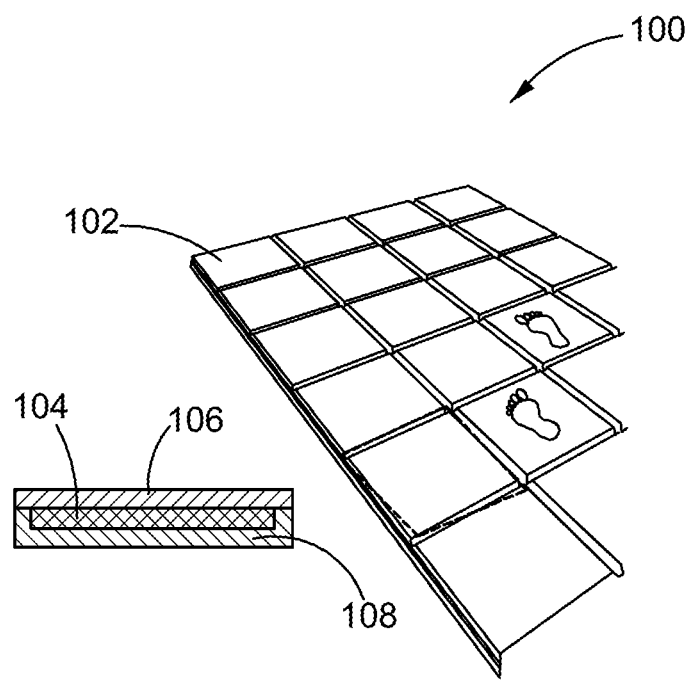
FIG. 1 schematically illustrates a sensory floor comprising a sensory flooring system.

Disclosed herein are sensory flooring systems, such as smart flooring systems, and sensory floors employing those systems. The flooring systems employ various design schema when incorporating electrode into floors, floor mats and the like. Such flooring systems can be used for various purposes as discussed herein, including monitoring for the passage of people and, in some embodiments, the identification of individuals.

Some buildings and areas require video surveillance or laser scanning surveillance for security purposes. Such systems are prone to invading the privacy of the individual they are monitoring, are high cost and often consume a considerable amount of power. Such systems therefore run contrary to the general concept of developing smart buildings. Flooring, on the other hand, being an interface with which people most frequently interact, can be implemented with embedded sensors to acquire the abundant sensory information from activities such as human walking, including indoor position, activity status, individual identity, etc.

The detected sensory information is of great importance in particular applications, such as nursing elderly people (e.g., fall detection by monitoring the irregular output signals in the time domain—abnormal outputs in a short period followed by no outputs), home automation of air conditioning/lighting, and security monitoring. Sensors incorporated into such flooring systems involve transducing mechanisms such as resistive, capacitive, piezoelectric, and triboelectric mechanisms. Of these mechanisms, piezoelectric and triboelectric mechanisms are particularly advantageous. By self-generating electrical signals in response to mechanical stimuli, system-level power consumption is reduced and the flooring may ultimately be designed to be self-sustainable.

To scale existing sensory flooring systems to cover a large area, the number of sensing pixels and signal collecting electrodes/channels needs to be dramatically increased, introducing extreme complications in the electrode layout, interconnection, and signal readout/process/analysis. Besides, the cost of manufacturing large-areas of conventional resistive, capacitive, and piezoelectric sensors is a major hurdle for practical implementation of sensory flooring systems.

The present disclosure provides a low-cost and large-scale floor sensing technology with optimized design to reduce systemic complexity for use in, for example, smart building applications. Combining the low-cost triboelectric sensing mechanism with the large-scale printing techniques offers a promising solution. Triboelectric sensors can produce self-generated electrical signals based on the coupling effect of contact electrification and electrostatic induction. Such sensors enable the simplification of the sensor configuration, are compatible with current manufacturing techniques, high scalability, have few or no material limitations, and are low cost. The combination of triboelectric mechanisms and printing techniques (e.g. inkjet, and roll printing) provides a good opportunity to achieve low-cost, large-scale, and self-powered floor sensing technology. In some embodiments, the present disclosure provides for flooring systems incorporating such triboelectric sensory mechanisms.

The present flooring systems also help reduce or minimize system complexity and the number of signal collecting electrodes/channels. In some arrangements, multiple electrodes, for example 4 electrodes, are arranged at the edges of a sensing area. These electrodes take the output ratios of opposite electrodes to determine the contact position with induced triboelectric charges. However, as the sensing area increases the induced outputs will become extremely small due to the large coupling distance. Such design schema are therefore not applicable in floor sensing applications. Another possible approach is connecting different electrodes with distinct patterns in parallel to reduce the total electrode number and still maintain good sensing performance. Such arrangements require a unique fingerprint-like signal from each electrode pattern.

Existing sensor arrangements and detection methods are based on the time-domain data analytics of the acquired sensing signals, normally using the signal magnitude and frequency. Such analytics approaches obtain some information but may lose some important features in the sensing signals, such as the identity information. To extract the full sensory information from sensors, as described herein, advanced artificial intelligence (AI) technology using machine learning (ML)-assisted data analytics can be applied in a monitoring system.

The recent technology fusion of AI and IoT has promoted the rapid development of artificial intelligence of things (AIoT) systems that can acquire, analyze, and respond to the external stimuli more intelligently, with the applied ML analytics on the sensory dataset to realize personalized authentication and object/intention identification. In some embodiments, the present flooring systems introduce AI processing functionality which can be used in security systems and authentication, home automation and personalized healthcare. The deep learning-enabled smart mats (DLES-mats, i.e., floor mats) disclosed herein may use triboelectric mechanisms to realize an intelligent, low-cost, and highly scalable floor monitoring system. In general, the smart floor monitoring systems disclosed herein integrate a minimal-electrode-output triboelectric floor mat array with advanced deep learning (DL)-based data analytics.

The DLES-mats can be fabricated by screen printing and other methods that are cost-effective, highly scalable and self-sustaining in large-area applications. In some embodiments, a distinct electrode pattern with varying coverage rate is designed for each DLESmat, mimicking the unique identification of the QR (quick response) code system. Thus, after parallel connection in an interval scheme, and design using minimal electrode outputs (e.g. two) with distinguishable and stable characteristics, a whole DLES-mat array can be produced.

In some embodiments, the parallel-connected DLES-mats use the relative magnitude of output signals (e.g. a ratio of output signals), for indoor positioning and activity monitoring. Furthermore, with the integrated DL-based data analytics, identity information associated with walking gait patterns can be extracted from the output signals using a convolutional neural network (CNN) model. Meanwhile, benefitting from the minimal two-electrode outputs, huge computing resources can be saved compared to traditional image or massive channel-based processes. Consequently, faster data analytics is achieved for real-time applications in smart building/home.

Figure 7:
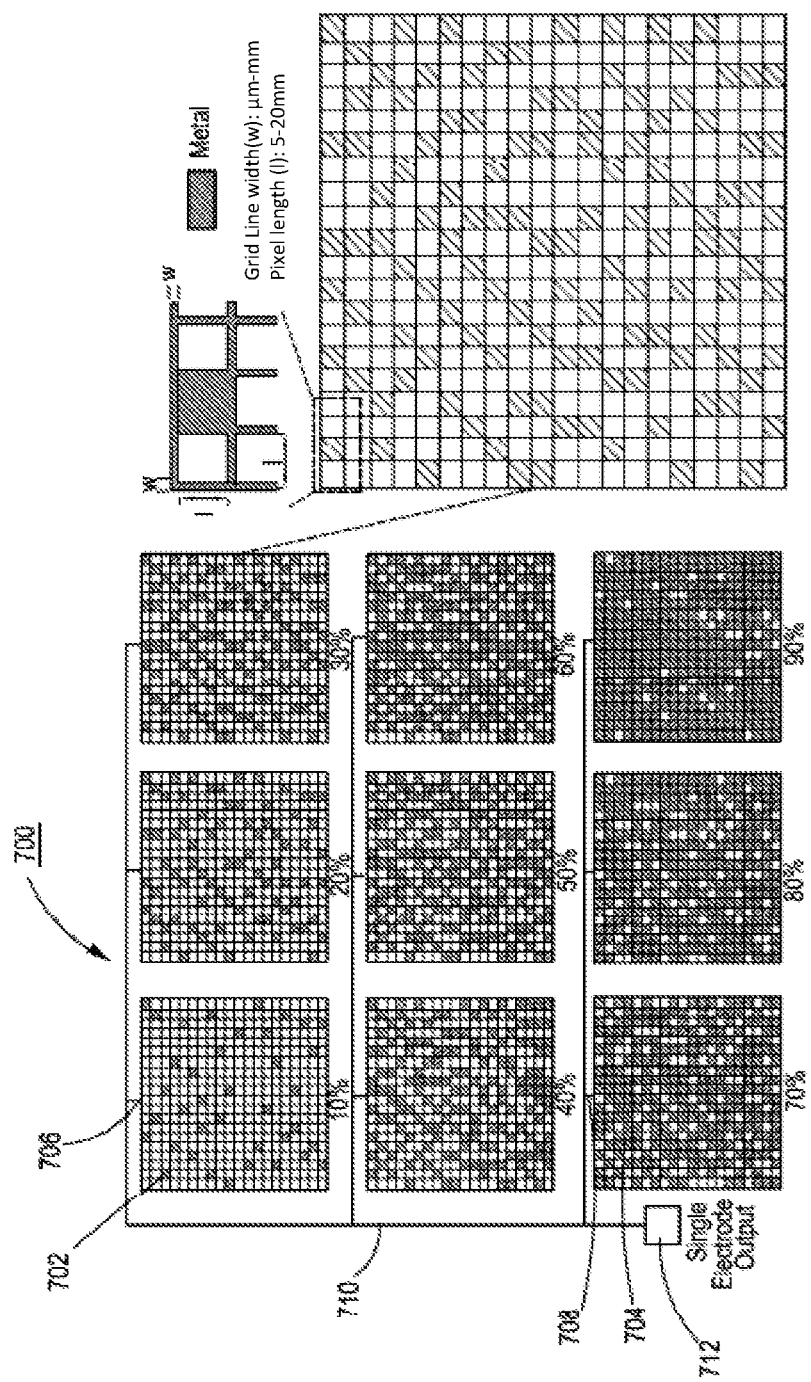
FIG. 7 is a floor mat array with grid electrode design where the electrode coverage rate is varying from 10% to 90%, with 10% increment.

Described with reference to the figures are advanced flooring designs that can distinguish between outputs using at least one of a grid electrode design, an interdigital (IDT) electrode design, and a coding electrode design. FIG. 7 shows one such example of a sensory flooring system 700. The system 700 comprises a plurality of flooring segments (e.g. segments 702, 704). Each flooring segment 702, 704 comprises one or more electrode portions 706, 708 (of electrode 710). Each electrode portion 706, 708 is responsive to a force applied to the respective flooring segment 702, 704. At least one electrode portion 706, 708 of a flooring segment 702, 704 forms an electrode 710 with at least one electrode portion 706, 708 of another said flooring segment 702, 704. Moreover, each flooring segment 702, 704 comprises a unique encoding of the one or more electrode portions 706, 708.

The unique encoding for each flooring segment 702, 704 may be achieved using a variety of different techniques. For example, a unique grid arrangement or density can be used as shown in FIG. 7. In such embodiments, the one or more electrode portions of each flooring segment may cover a unique proportion of an area of the respective flooring segment. In further embodiments, a unique coding is implemented using flooring segments each of which comprises two or more electrode portions, where the power output ratio of the two or more electrodes, when force is applied to the floor segment, is unique to that floor segment. Such a unique encoding can be achieved using a unique interdigitation scheme or design for each flooring segment.

With reference to FIG. 1, a further flooring system 100 is illustrated. Each pixel of the floor mats or segments 702 is separated from each other pixel. The electrodes, and thus the electrode portions at least partially forming those electrodes, used in the pixels may be of a single type using particular encoding schema, or may be one of a plurality of types. The type of electrode may be, for example, an energy harvesting electrode, a first monitoring electrode, a second monitoring electrode and so on. In the embodiment shown, the electrode portions of the same type, from all the pixels, are connected together to form the minimal electrode output—e.g. a single electrode.

The electrode is formed by a metal layer 104 sandwiched between a friction or contact layer 106 and the substrate 108. The friction layer 106 is the walking surface to which contact force is applied by a human moving over the respective flooring segment 702. Presently, a thin layer of PET with relatively high triboelectric positivity is utilized as the friction surface or contact layer for common foot stepping. PET is a semi-crystalline polymer film with a high optical transparency, a thin thickness of 125 μm, and a glass transition temperature of 81.5° C. First, to produce individual floor mats, a large-area PET thin film is cut into squares with dimensions of 42 cm×42 cm. The PET thin film is then pretreated on one side with a primer treatment for promoting the adhesion with the later printed electrode layer. After that, a layer of silver paste as the charge collection electrode is printed on the pretreated PET surface by screen printing, followed by a thermal curing at 130° C. for 30 min using a thermal oven. The printed thickness of the silver electrode is about 15 μm. Next, the PET film with the printed silver electrode is cold-laminated with a layer of 80-μm-thick PVC. The PVC layer serves as the supporting substrate with a square opening of 2 cm×2 cm on the connector pad for wiring purposes. Following that, a copper wire is connected to the electrode by conductive paste through the opening, which is then sealed with thin Kapton tape. Finally, different fabricated floor mats are pasted on a woolen floor, and the wires from each floor mat are connected based on the investigated connection scheme for later characterizations.

Since the electrode pattern of each pixel is specifically designed, that specific design provides a unique encoding. Consequently, the outputs from the contain self-distinguishing information that allows the pixel to be differentiated from the pixels. In terms of manufacturing, inkjet printing or screen printing can be adopted to fabricate the large-area, flexible and thin floor mats with high efficiency. With these novel electrode designs, the whole functional floor mat system can be realized with only a minimal number of electrodes. Such mats can be applied in applications involving human activity monitoring (e.g., position of person, activity type of walking/running/jumping, person recognition based on walking patterns, etc.) and energy harvesting from daily activities. The floor mat systems (i.e. sensory flooring systems) described provide self-generated signals, are flexible and thin nature, allow a versatile choice of materials, are cost effectiveness and can be employed in diverse applications such as smart buildings, automatic access/denial of access to areas based on pattern recognition, fall detection, security, entertainment, etc.

A potential application employing such a flooring system 100 is shown schematically in a sensory or smart floor monitoring system 200 shown in FIG. 2a. The sensory floor 200, a DLES-mat array 202 is attached to a corridor floor 204. When a person 206 is walking on the DLES-mat array 202, the generated electrical signals from the contact-separation motion of each step can be acquired. The uniqueness of the signals generated by each pixel or each flooring segment can then be used for position sensing of the person 206.

In addition to the sensory flooring system, presently embodied by DLES-mat array 202, the sensory floor 202 includes a receiver or signal acquisition module 208. The module 208 receives the electrical output from the electrodes formed by the one or more electrode portions of each flooring segment 210 of the flooring system 202. A processor 210 analyses the electrical output and identifies the flooring segment or segments by which the electrical output was produced. Accordingly, the corridor light 212 above the corresponding position can be switched on by the system for lighting purposes when the person reaches a particular position on the floor 204. When no signal is detected for a certain period of time, the system can also switch off the lights to conserve energy.

With the integrated DL-based data analytics, individual recognition can also be achieved according to different walking gaits. The realized individual recognition can be adopted in automatic access or authentication purposes and, for example, open the door 214 for recognized valid or authenticated users.

According to the triboelectric theory, under the same contact conditions (e.g., contact area, pressure, etc.), the same amount of triboelectric charge should be generated on a dielectric friction surface. Consequently, a charge collected under the electrostatic induction varies according to the electrode area beneath the dielectric surface—e.g. friction surface 106.

Normally, the output of the triboelectric sensor can be analysed by a variable capacitor model. The generated open circuit voltage is given by $V_{OC}=Q/C$, where Q is the effective induced charge on the electrode (positively related to the electrode area) and C is the equivalent capacitance of the triboelectric sensor. For parallel-connected triboelectric sensors, the same equivalent capacitance is shared in the output generation. In this regard, triboelectric sensors with different electrode areas will generate outputs of different magnitude, proportional to the effective induced charge on the electrode, making them distinguishable in a parallel connection. Therefore, in the smart floor monitoring system 200, DLES-mats or segments of sensory flooring systems 202 have different electrode coverage rates.

The segments or flooring systems can be designed and fabricated using various methods and materials. For example, fabrication may be through screen printing the designated electrode patterns on a polyethylene terephthalate (PET) film and further packaging with another polyvinyl chloride (PVC) film.

A schematic diagram of a sensory flooring system is shown in FIG. 2b. As is evident, each flooring segment comprises a unique encoding of electrode portions. The one or more electrode portions of each flooring segment collectively cover a unique proportion of the area of that flooring segment. This is referred to as grid encoding. The unique proportion of the area of each flooring segment will typically comprise a percentage of each flooring segment. For example, the proportion of the area of segments 222 and 224 that is covered by electrode segment is 100% and 0% respectively. In the case of segments 226 and 228, the proportion of the area that is covered by electrode portions is patterned and, in the case of segments 230 and 232, it comprises a random coverage.

The enlarged image in FIG. 2b illustrates the three stacking device layers, those being a PET friction layer 216, a silver (Ag) electrode layer 218, and PVC substrate layer 220.

FIG. 2c illustrates an assembled floor mat array 234 as well as, with reference to the incident, the flexibility of a floor mat with 40% electrode coverage rate—the scale bar in each case is 20 cm long;

FIG. 2d shows detailed electrode patterns of floor mats (i.e. flooring segments). Six electrode coverage rates are used, ranging from 0 to 100%, with 20% steps. The size of the steps achieves a rational balance between the clear distinction between flooring segments being activated (i.e. to which force is applied during use) and the number of flooring segments. The black regions represent printed silver (Ag) electrode portions. The coverage rates are evident from the proportion of black regions to white regions in each segment. The electrode interconnection is provided by uniform grid lines throughout the flooring segment.

The vertical and horizontal grid electrode lines form a 20×20 array of empty squares (20 mm×20 mm), that can be further selected to be filled with Ag to achieve different and uniformly distributed electrode coverage rates. Although a 20×20 array has been used, arrays of any appropriate size may be used for a particular application.

In embodiments, all the electrode patterns of 20, 40, 60, and 80% are obtained during manufacture using the same 20% printing mask. This can be achieved by changing the orientation of the printing mask during successive printing cycles applied to the same flooring segment. For example, with the mask oriented upward, the printing results in the 20% coverage. Afterward, a further printing cycle on the same segment, with the mask oriented downward, leads to 40% coverage. A subsequent printing cycle with the mask oriented right and left will result in the 60% and the 80% coverage, respectively. Thus, only one printing mask may be required, which can reduce fabrication cost.

To elucidate the operation mechanism of the assembled DLES-mat array in a straightforward manner, the configuration with two DLES-mats or sensory flooring segments in parallel connection is used as an example—see FIG. 2e. The PET friction layer adopted here is relatively positive. As a result, most common materials (e.g., socks and shoe soles) become negatively charged after contacting it. This leaves the PET friction layer positively charged. After that, when a person steps on the segment with less electrode coverage rate as shown in FIG. 2e, a certain amount of electrons will be repelled to flow through the external circuit to the ground until new electrostatic equilibrium is achieved. According to the above theoretical model, the amount of flowing electrons is proportional to the electrode coverage area. Thus stepping on a flooring segment with less electrode coverage rate generates a smaller output current/voltage pulse.

When the person steps off the flooring segment, the same amount of electrons flow back to the electrode from the ground. This generates a reverse current/voltage pulse in the external circuit.

In contrast, when the person steps on and off the flooring segment with higher electrode coverage rate (FIG. 2f), a larger amount of electrons will flow in the external circuit. This produces a larger output current/voltage pulse. Through the design of varying electrode coverage rates, the generated triboelectric signals with different relative magnitudes can thus be adopted to distinguish the outputs from different flooring segments (e.g. DLES-mats) or sensory floors and determine the corresponding walking positions of people thereon.

Hereinafter, the term DLES-mats will be interchangeably used with flooring segments. To illustrate the output and connection scheme: with the parallel connection of six fabricated DLES-mats (0-100%), the output from each floor mat is first characterized with repeated stepping motions by both the right foot and the left foot wearing shoes with a polytetrafluoroethylene (PTFE) sole in four directions (i.e., N, north; E, east; S, south; W, west). The generated output voltages on a 1 MΩ external load from the six DLES-mats are shown in FIGS. 3a to 3f, for 0%, 20%, 40%, 60%, 80% and 100% coverage respectively. Notably, the signals are larger as coverage increases. Also, the signals are substantially uniform regardless of stepping direction on the respective segment—e.g. N, S, E and W.

The output voltages of the triboelectric DLES-mats were measured by an oscilloscope (Agilent DSO-X3034A) with a recording impedance of 1 MΩ as well as 100 MΩ for waveform comparison. In terms of the voltage and power characteristics versus varying resistor loads, the output voltages on different loads were measured by a Keithley 6514 Electrometer connected in parallel. The peak power on the corresponding resistor load was calculated using the formula $P=V^2/R$, where P, V, and R are the peak power, measured output voltage, and resistance of the resistor load, respectively. As for the capacitor charging, the voltages on different capacitors were also measured using the Keithley 6514 Electrometer in parallel connection with the capacitors.

FIG. 3g summarizes the average output trends of the maximum voltage, minimum voltage, and peak-to-peak voltage. Clearly observable is the expected absolute magnitudes of all three output voltages showing a positive relationship with the electrode coverage rate. To maximize the distinction between the outputs of different DLES-mats, the peak-to-peak voltages are used for signal analysis and later characterization.

FIG. 3h shows the effect of different users (U1, U2 and U3) wearing PTFE shoes on the output performance; Although the output magnitudes of different users are different, the increment trend of relative output magnitudes of each user is similar, suggesting the suitability of the DLES-mat design in individual position sensing. The position of a user on the DLES-mats can be determined by the relative output magnitudes with respect to the output from the 0% DLES-mat.

Figure 3J:
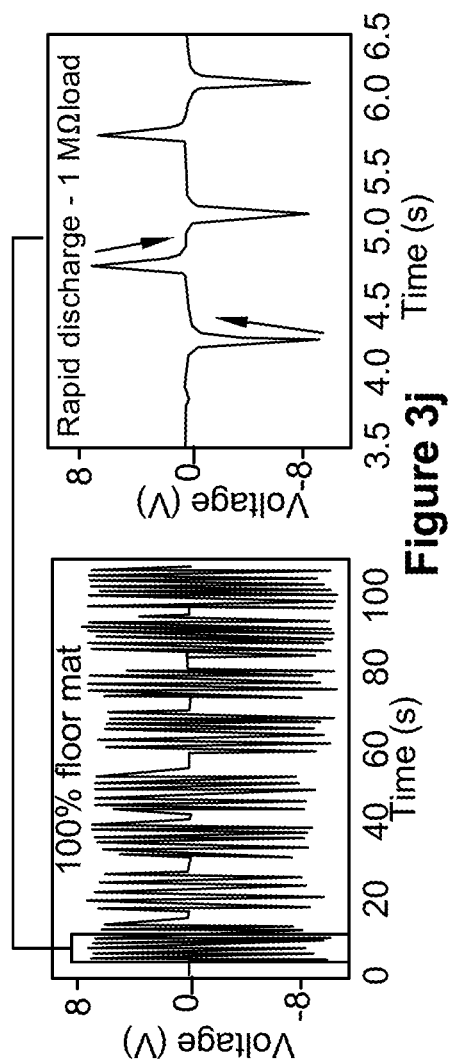
FIGS. 3j and 3k show the voltage response and output for a mat with 1 MΩ external load (FIG. 3j) and 100 MΩ external load (FIG. 3k)
Figure 3K:
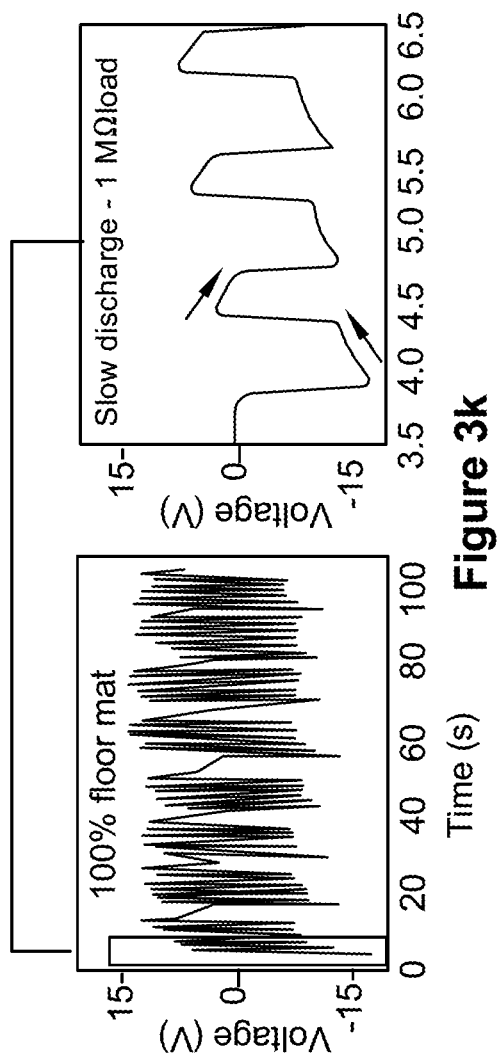

FIG. 3i shows the effect of different contact materials worn by the same user wearing traversing across the sensory floor comprising the sensory flooring having DLES-mats for segments. The different materials used in the experiment were a cotton sock, ethylene vinyl acetate shoe, and a PTFE shoe. The different materials result in similar increment trends of relative output magnitudes observed from all the materials. This once again demonstrates the applicability of the floor mat design in the scenario of position monitoring. When the generated output voltages are measured on a 100 MΩ load, similar results can be achieved. Notably, higher absolute magnitude is achieved with the 100 MΩ load due to its higher resistance, but the relative output magnitudes exhibit similar trends. However, because of the higher measuring resistance, the generated output pulses on the 100 MΩ load take longer time to discharge (RC discharge), causing the overall signals to shift upward in each repeating period of stepping. The detailed output waveforms on the 1 and 100 MΩ load with different discharge time can be found in FIGS. 3j and 3k.

Figure 4A:
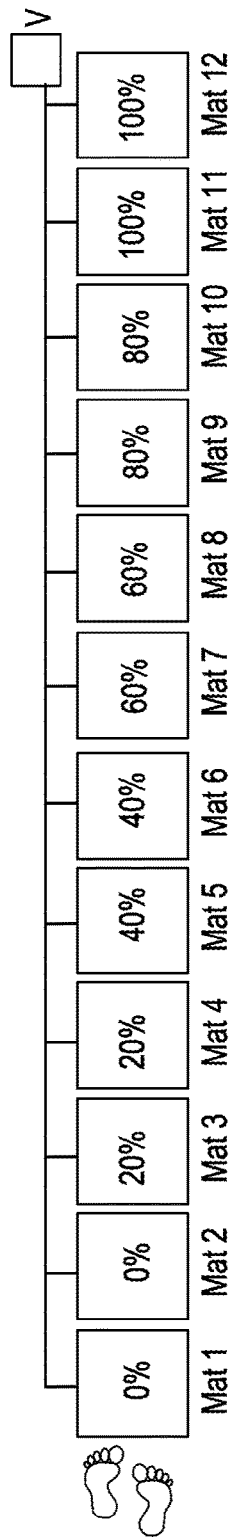
Figure 4B:
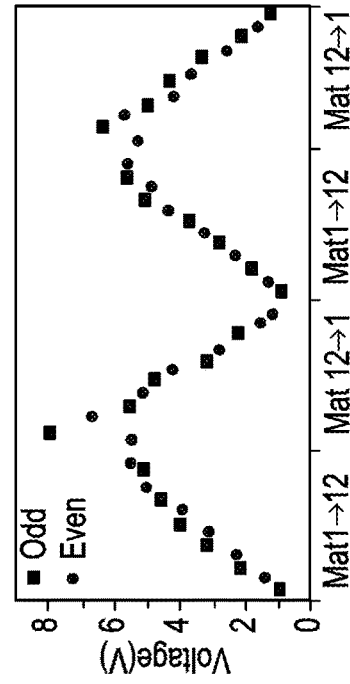

Unique electrode each segment enables them to be connected in parallel. This reduces the number of output electrodes. A parallel connection of 12 DLES-mats (2 sets of 0-100%) in a one-dimensional arrangement is constructed, as depicted in FIG. 4a. When a person subsequently walks on the 12 DLES-mats, the generated voltages on a 1 MΩ load and a 100 MΩ load are illustrated in FIGS. 4b and 4d, respectively. PTFE is adopted as the contact material here and hereafter unless otherwise specified. Two rounds of forward-backward walking are repeated with left foot stepping first for the first round and right foot stepping first for the second round. It can be seen that the output voltage on the 100 MΩ load has a wider pulse width due to its much slower discharge time. This leads to the overlapping of adjacent voltage pulses and the distortions of output signals.

Figure 4C:
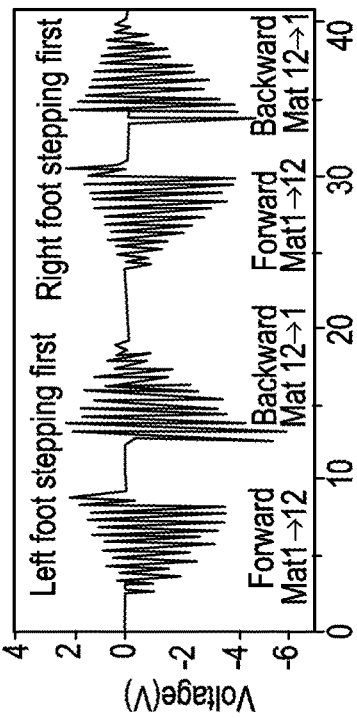
Figure 4D:
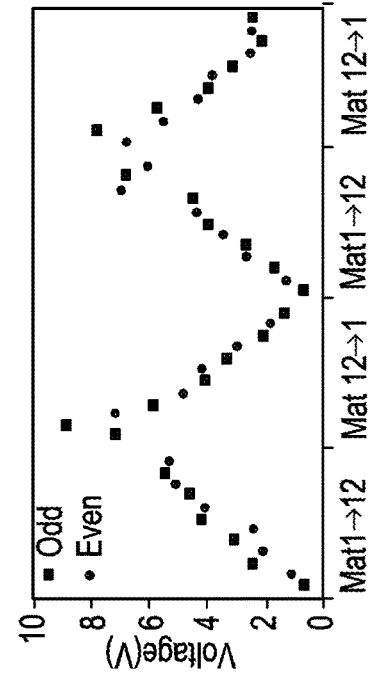
Figure 4E:
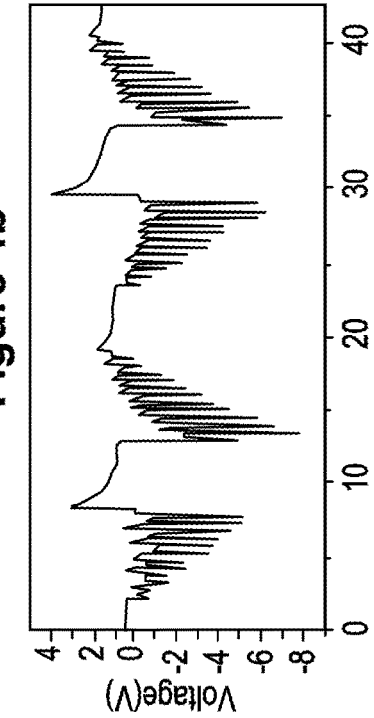

The corresponding peak-to-peak voltages extracted from FIGS. 4b and 4d are plotted in FIGS. 4c and 4e, respectively.

A more stable increment-decrement trend of relative magnitudes can be observed for the 1 MΩ load due to its rapid discharge time compared to the 100 MΩ load. Yet the resultant voltage trend is still unsatisfactory, with a clear deviation from the ideal increment-decrement trend. This deviation is caused by the overlapping of two opposite voltage pulses from two simultaneous stepping motions, i.e., a negative pulse from stepping on the next DLES-mat and a positive pulse from stepping off (leaving) the previous DLES-mat.

Figure 4F:
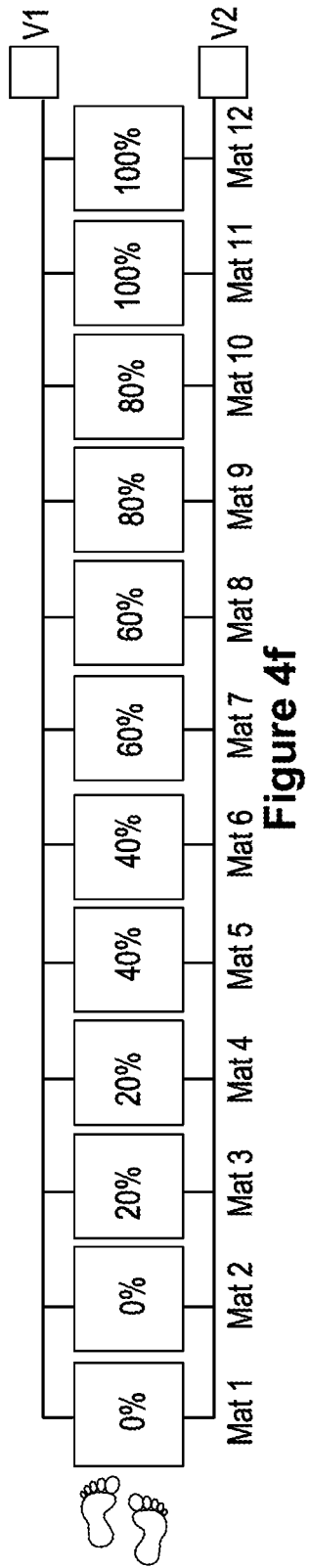
Figure 4H:
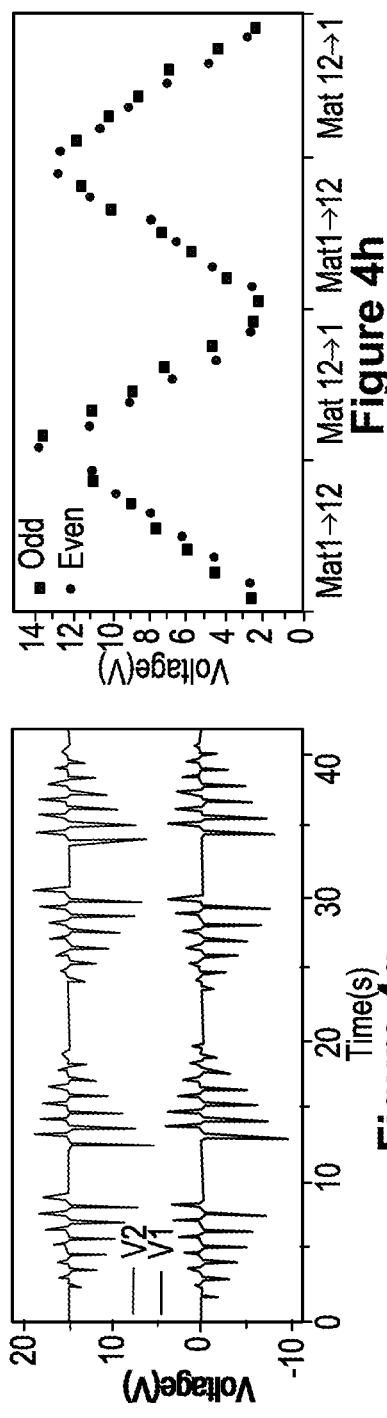
Figure 4G:
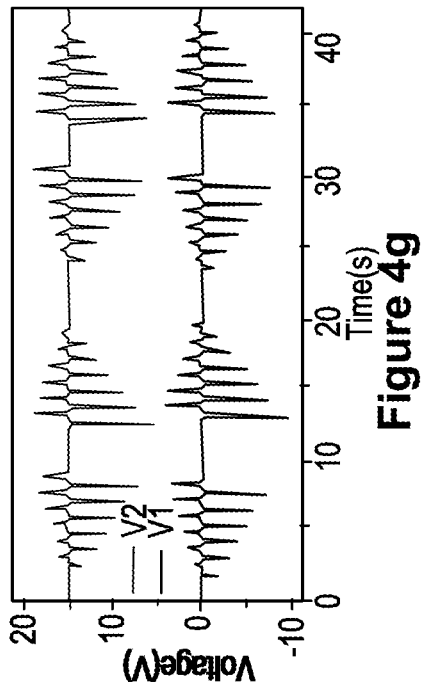
Figure 4J:
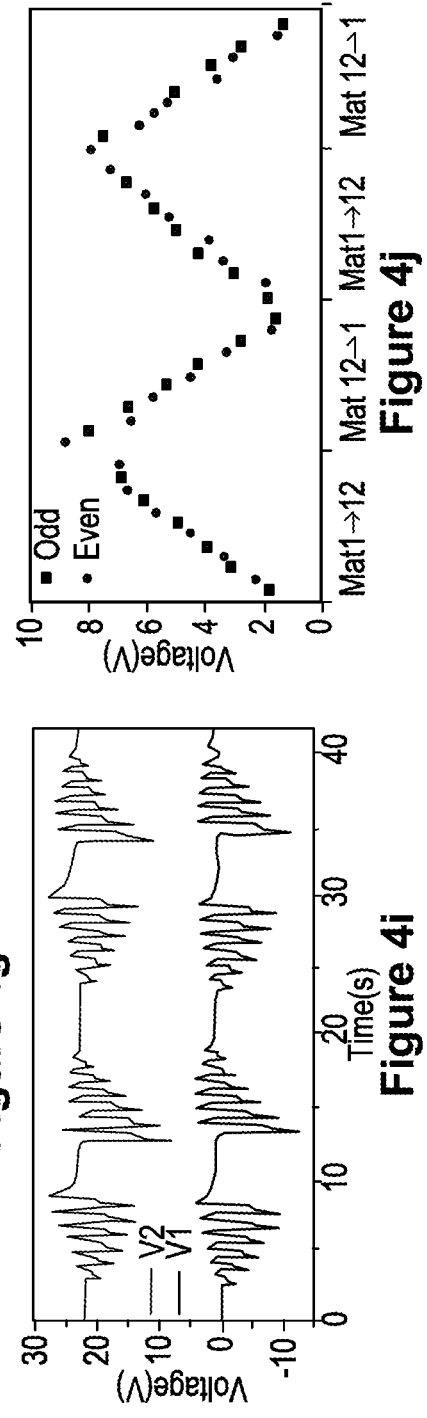
Figure 4I:
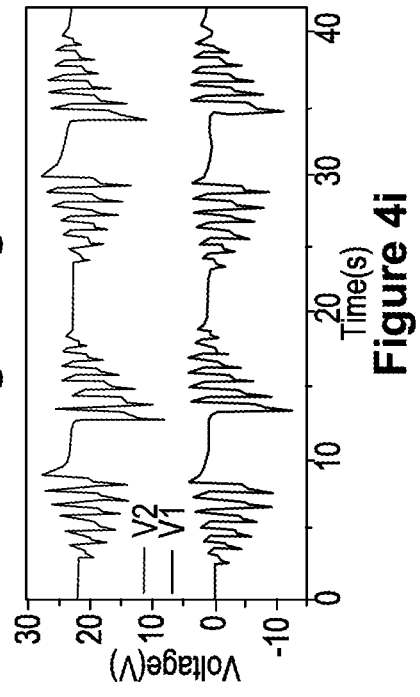

Therefore, to improve the signal stability of the detected output voltages, an interval parallel connection is implemented as shown in FIG. 4f. From the measurement results shown in FIGS. 4g to 4j, the corresponding output voltages exhibit a much more stable increment-decrement trend for both the 1 MΩ load and the 100 MΩ load. This is because the interference from the walking motions on adjacent DLES-mats is eliminated. That is to say, one walking motion (stepping on and stepping off) can be fully completed on one DLES-mat before entering the next DLES-mat connected with the same output electrode. Therefore adjacent flooring segments or pixels in a sensory flooring system can be associated with respectively different electrodes. For example, the floor segments and associated electrodes may alternate or change according to a pattern, or each electrode may be connected with a single flooring segment in each step or stride length of the sensory flooring system, or over another distance dependent on a predetermined or expected stride length. This avoids overlapping voltage pulses in the generated signal waveforms and creates a more ideal increment-decrement trend. The same conclusion can be drawn that the interval parallel connection produces a more stable and ideal increment-decrement trend for signal detection and analysis. Hence, an interval parallel connection scheme with two (or more than two, in some cases) output electrodes is adopted in the sensory flooring system of some embodiments, to effectively reduce the number of required sensing electrodes and simultaneously achieve the desired differentiation between different DLES-mats.

Based on the above characterizations, the interval parallel connection scheme is adopted to implement the two-dimensional DLES-mat array for actual position sensing applications. This is reflected in FIG. 5a. Each set of the six floor mats is connected to one electrode, resulting in only two output electrodes required for the whole 3×4 array. The 12 digits (1-12) in the schematic indicate the numbering of the DLES-mats in sequence along the sensory floor. Walking tests with two repeated forward-backward cycles (left foot stepping first in the first cycle and right foot stepping first in the second cycle) along different trajectories are conducted to verify the position sensing capability of the DLES-mat array, as shown in FIGS. 5b to 5f.

According to the relative magnitude trend obtained in the study associated with FIGS. 4a to 4j, voltage pulse with higher peak-to-peak magnitude is generated from the DLES-mat with a higher electrode coverage rate. For example, in FIG. 5b, the person is walking on the first row of the DLES-mat array, with Mat 1 (0%) and Mat 3 (60%) connected to electrode 2 (E2—with output V2) and Mat 2 (100%) and Mat 4 (40%) connected to electrode 1 (E1—without output V1). From the output voltages in both cycles, a clear trend is observable in the voltage magnitudes on both electrodes. For walking forward from Mat 1 to 4, an output voltage pulse with the lowest magnitude is first generated on E2 (0%), and then an output voltage pulse with the highest magnitude is generated on E1 (100%). Next, an output voltage pulse with a relatively smaller magnitude is generated on E2 (60%). Last, an output voltage pulse with an even smaller magnitude but still larger than the first pulse is generated on E1 (40%), until the person steps off the DLES-mat array and no output voltage is generated.

A reverse sequence of output voltages can be observed for walking backward from Mat 4 to Mat 1. The same output voltage trends can be observed in both cycles, indicating the stability of the DLES-mat array for position sensing. Similarly, for the other walking trajectories shown in FIGS. 4c to 4f, position sensing and walking trajectory detection can also be achieved based on the generated voltage signals on both the output electrodes and their relative magnitudes. This real-time position sensing capability enables the DLES-mat array in the application scenarios of automation control (such as lighting and air conditioning) and fall detection (by detecting the abnormal signal patterns of multiple peaks in a short period due to the falling-induced rapid contacts and no outputs in the following).

Figure 5G:
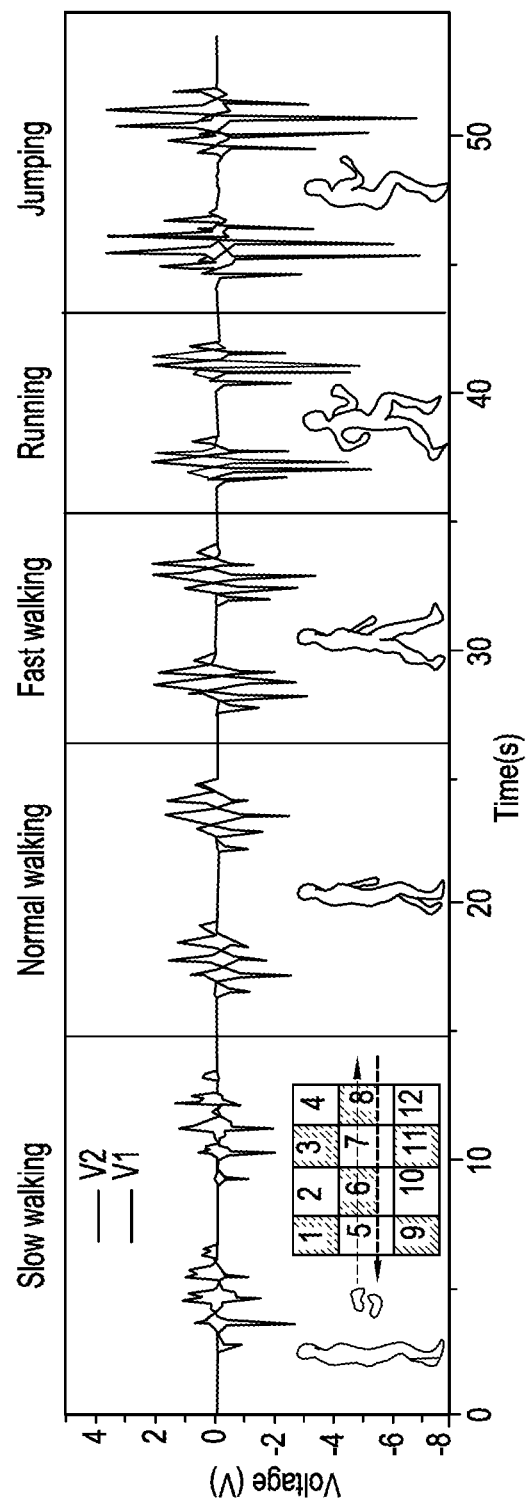

In addition to position sensing, the DLES-mat array can also be adopted for activity monitoring and potential energy harvesting from our daily activities. FIG. 5g depicts the output signals of a person performing five different types of activities, i.e., slow walking, normal walking, fast walking, running, and jumping, on the middle row of the DLES-mat array in a forward-backward manner. Different types of activities can be easily distinguished based on the overall magnitude and time period (frequency) of the output signals, indicating the activity monitoring capability. In this regard, the DLES-mat array can be applied for potential healthcare applications in exercise monitoring, including the type of exercises, the time period of the exercise, and the burned calories based on the type and period of the exercise. Next, the output voltage and power of the DLES-mat array with respect to different external resistances are measured under normal walking. A maximum output power of 8.57 µW can be obtained at 1.96 MΩ under normal walking. Due to the large capacitance of the DLES-mat array, the saturated output voltage (close to the open-circuit voltage) for the same stepping motion is relatively low according to VOC=Q/C. With a smaller DLES-mat area/capacitance, the saturated voltage can be improved for more effective energy harvesting. Thus, the outputs from individual DLES-mat (100%) of 40 cm×40 cm and 30 cm×12 cm are also measured. The, with the saturated voltage greatly improved with a smaller area, but the matched resistance also increases. For the 40 cm×40 cm and the 30 cm×12 cm DLES-mat, the maximum output voltage is 55.0 and 144.0 V at 100 MΩ, respectively, while the maximum output power is 169.46 µW (at 9.10 MΩ) and 800.84 µW (at 13.79 MΩ).

In practical applications, the rectified output voltages can be applied to charge up capacitors as sustainable power sources for other IoT devices in smart buildings. After charging up a 27 µF capacitor to 8 V, the stored energy is sufficient to support one operation cycle of the sensor. These results demonstrate that the operation of IoT devices with intermittent functionalities can be supported by the developed DLES-mats.

Therefore, the sensory flooring system or sensory floor incorporating a sensory flooring system may comprise an external load/resistance. The external load may be selected based on an expected time between successive footfalls on the sensory flooring system during normal use—e.g. the capacitance discharge time may be set to be equal to or slightly less than an expected time between successive footfalls/steps on flooring segments associated with a particular electrode.

When integrating the DLES-mat array with DL assisted signal analytics, a smart floor can be realised that achieves monitoring functions for position/activity sensing but also recognition/identification of individuals. The walking gait pattern of a person is different from others. That gait can generate a unique output signal for recognition of individuals.

The overall structure of a sensory flooring system for achieving recognition is shown in FIG. 6a. When a person walks over the DLES-mat array, triboelectric output signals are generated by the periodic contact-separation motions of human steps. These generated signals are then acquired by the signal acquisition module, residing in an Arduino MEGA 2560 microcontroller in the present embodiment. To generate training data for individual recognition, the signal data from each channel is recorded with 1600 data points (2 channels in total) and 100 samples are collected for each user (80% for training and 20% for testing). A whole dataset is built from 10 different users, with a total number of 1000 samples. The DL model is created based on CNN in order to provide high recognition performance, where the parameters used to construct the CNN model are labelled in FIG. 6b. After the training process in the CNN model with 50 training epochs, the maximum accuracy can be achieved, and the CNN model is able to generalize enough to avoid overfitting. The average recognition accuracy is 96.00% (FIG. 6c), providing great potential for high-accuracy control based on the DL prediction.

Recognition testing can also conducted for the same user in different passing statuses (i.e., normal walking, fast walking, and running), to demonstrate the applicability of the smart floor monitoring system in various situations. The trained DL model is able to distinguish the different passing statuses of the 4 users (12 classes) with an accuracy of 89.17%. Besides, if all the passing statuses from the same user are set as one individual label (just distinguish the user without knowing his passing status), the accuracy of the testing set after training reaches 91.47%. These results indicate that, even when the user passes through the DLES-mat array in different ways, the smart floor monitoring system can still recognize and identify the user with a high accuracy of 91.47%.

To demonstrate the practical usage scenarios, a virtual corridor environment mimicking the real corridor was built to reflect the real-time status of a person on the DLES-mat array, including position sensing through the peak detection and individual recognition through the DL prediction. Unlike the camera-based monitoring that normally involves the video-taken concerns the sensory flooring system, using a digital twin of the person in the virtual environment, only shows the position information and identity of the particular person, which are basic parameters required for automation, healthcare, and security applications.

Figures 6D, 6E, 6F:
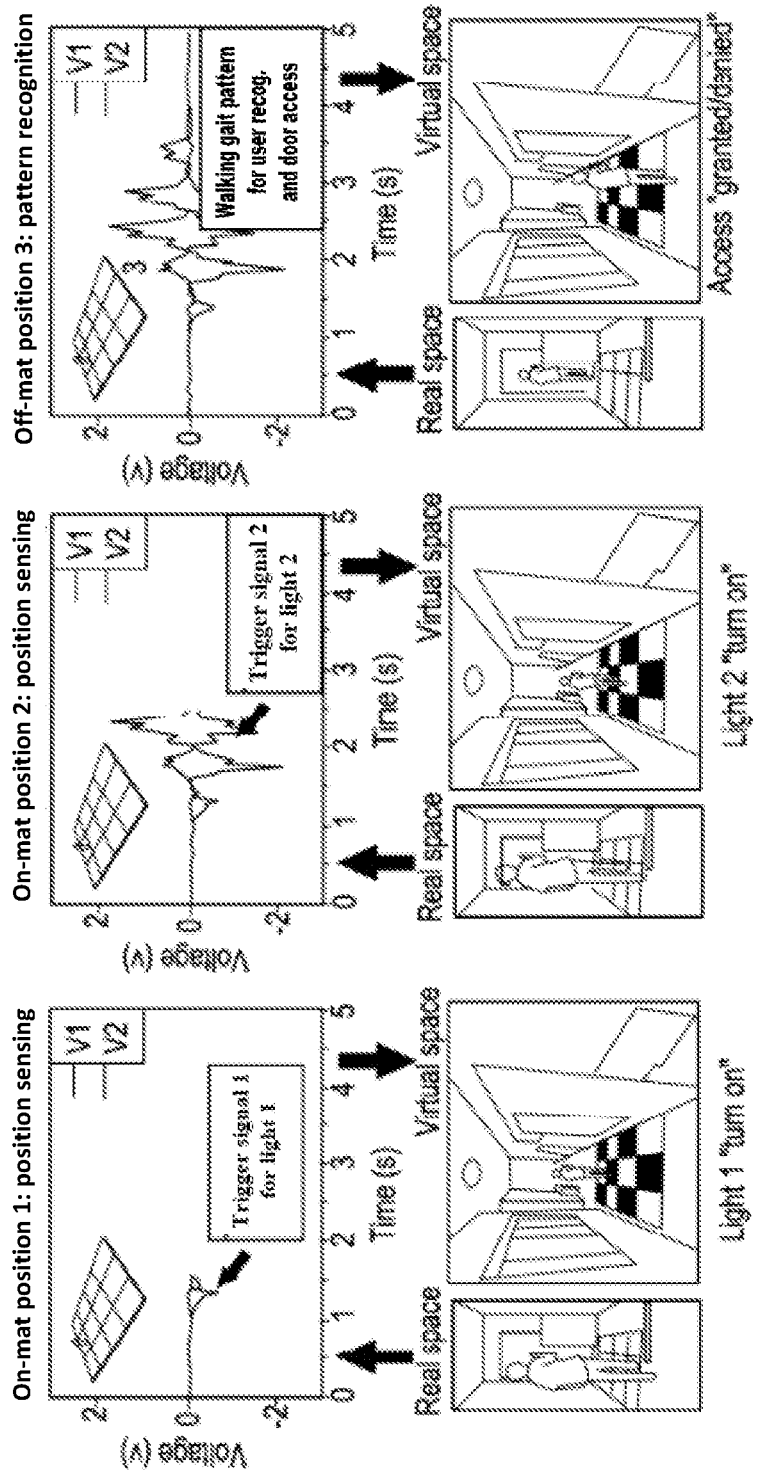

The overall flow of the signal acquisition and analysis process is shown in FIG. 6a. When a person first steps on the DLES-mat array on Position 1 (600), a small negative peak is generated from E1 (20% mat). The receiver acquires the signal (602) and a microprocessor control unit (MCU) of the processor of the sensory floor is configured to analyse the signal comprising the peak (604). The MCU may adopt the initial peak, or small negative peak, as a trigger signal. In response, the processor moves a digital twin (of the user) to the first DLES-mat (606). It may also turn on a corresponding light, Light 1, or toggle a device (e.g. open a door) as indicated in FIG. 6d.

When the person continues walking, a large negative peak from E2 (80% mat, as the trigger signal to move the digital twin to the second DLES-mat) and a small positive peak from E1 (20% mat) are generated. Then upon stepping on Position 2, a negative peak with relatively smaller magnitude than the 80% mat is generated from E1 (60% mat), which is used as the trigger signal to move the digital twin to the third DLES-mat and turn on the corresponding Light 2 or toggle a device, as indicated in FIG. 6e. After walking through the whole DLES-mat array and reaching Position 3, a full cycle of the output signal is generated from both electrodes as illustrated in FIG. 6f. This reflects the unique walking gait of the person. The full-cycle output signal is then analyzed by the trained DL model (608) to predict whether the person is a valid user of a room the door to which is controllable using the system 600 (step 610). If the person is a valid user, then access to the room is granted and the door will open. Otherwise, access is denied and the door will remain closed.

There is a small delay between the motions in the real and virtual space due to the time taken for signal processing and analysis. In this scenario the personal identity is still revealed with certain privacy concerns. Another approach can be implanted to better protect privacy where only the recognition of valid and invalid users is required. At the training stage for the DL model, labels with privacy information like the name of the person will not be included but only a label of "valid user" for all the users with valid access. Thus, the sensory floor processor can simply distinguish between a valid user and an invalid user. Therefore, the system does not identify the particular person on the sensory floor, but identifies whether the person on the sensory floor is categorised as valid or invalid. When a person walks on the DLES-mat array with a recognized walking pattern, a message of "valid user" may be displayed without revealing any of the person's privacy information and the door will be automatically opened. Then if their walking pattern is not recognized, the message of "invalid user" will be displayed and the door will remain closed. In this way, the recognition of valid and invalid users can be achieved without revealing the identity and the privacy information of the person. Overall, in this demonstration, real-time position and individual recognition of a person walking on the DLES-mat array can be successfully achieved, showing the great potential of the smart floor monitoring system in smart building relative automatic control and security access.

At step 608, the processor of the sensory floor employs a DL training model. The DL training model comprises a convolutional neural network. The convolutional neural network may have any appropriate structure. Presently, it comprises an input, and an alternating sequence of convolutional layers and max pooling layers, followed by a fully connected output layer. The generated triboelectric signals from the DLES-mat array were acquired by a signal acquisition module in an Arduino MEGA 2560 microcontroller in a real-time manner. To acquire training data for individual recognition, signal data from each channel was recorded with 1600 data points (2 channels in total) and 100 samples are collected for each user's walking pattern. 80 samples were used for training (80%) and 20 samples are used for testing (20%). The dataset was built for 10 different users, with a total number of 1000 samples. The CNN models used in the system are configured as follows: the categorical cross-entropy function is applied as the loss function, adaptive moment estimation (Adam) is used as the update rule due to its optimization convergence rate, and prediction accuracy is used to evaluate model training. The CNN models are developed in Python with a Keras and TensorFlow backend. The feature-based models are trained on a standard consumer-grade computer. The learning rate can be adjusted during training using a Keras callback.

The above figures show how the sensory floor can be used, and illustrate something of the composition of the flooring segments. The remaining figures and accompanying description delve into flooring encoding schema and the results of their practical application.

A grid electrode design is depicted in FIG. 7. For each floor mat a grid line metal pattern is used to define the electrode pixel coverage areas and for the interconnections of all the metal patterns. Different electrode coverage rates can be achieved, e.g., 0%, 10%, 20%, . . . , 90% to 100%, by filling the pixel coverage areas with metal. The electrode coverage rate is defined as the pixels filled with metal over the total pixels in each floor mat.

FIG. 7 shows an array of 9 floor mats with electrode coverage rate from 10% to 90%. They are connected in parallel into a single electrode output 712. This minimizes the number of electrodes. The definition and dimensions of the electrode coverage pixel is also shown, where the grid line width can be varied from μm range to mm range. The pixel length can also be varied according to the application requirements and the fabrication technique.

Figure 8G:
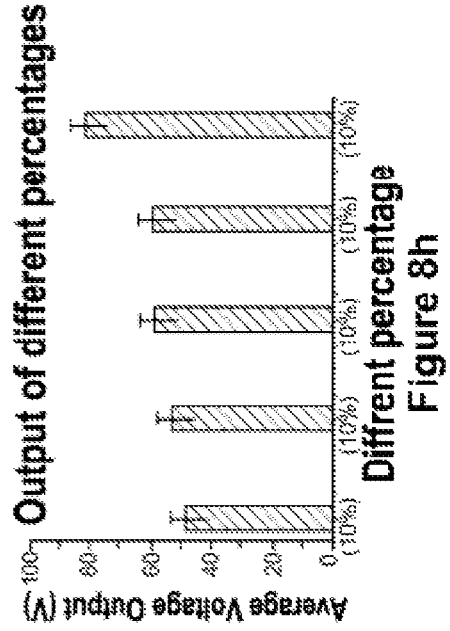
Figure 8H:
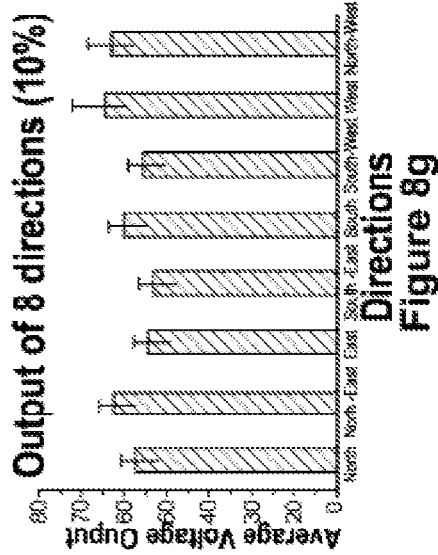
FIG. 8h is the outputs from different floor mats with 10% to 90% electrode coverage.

FIGS. 8a to 8f show the output voltages from 10%, 50% and 90% floor mats, respectively, under the foot stepping wearing cotton sock in eight different directions (north, northeast, east, southeast, south, southwest, west, and northwest). First, outputs gradually increase from 10%, 50% to 90%, because of the higher electrode coverage rate and higher induction efficiency of triboelectric charges. For the same floor mat, outputs from all the eight directions exhibit similar level, due to the random and evenly distributed filled pixels on the floor mat. Theoretically, the smaller coverage electrode pixel, the less variation will be introduced in different directions. FIG. 8g shows the magnitude comparison of eight directions from the 10% floor mat, showing similar level of output around 48 V. In terms of the outputs from different floor mats (10% to 90%) showed in FIG. 8h, the outputs increase with the electrode coverage rate. This indicates that distinguishing between floor mats can be achieved through the output signal magnitude for normal human walking. More advanced signal analysis techniques such as machine learning can be adopted here to assist the recognition of different persons, position, and activity states, based on the output signal patterns as discussed above.

Triboelectric output can be affected by different methods of operation and environmental factors. These affect the output signal magnitudes and waveform patterns. Consequently, the grid electrode design may need to have advanced analysis technique to facilitate the detection of a specific floor mat under operation. Instead of a grid pattern, an interdigital or interdigitated (IDT) electrode design can be used. The IDT design is based on the voltage ratio of left comb electrode to right comb electrode and shows high robustness and reliability. This is the result is achieved by neutralizing variations in the voltage ratio of the outputs of the two electrodes since the effects of variations are the same on both electrodes. Therefore, a sensory flooring system may be configured to neutralise a variation in output (e.g. voltage ratio from two or more electrodes) using an interdigitated structure for the electrode portions.

Figure 9:
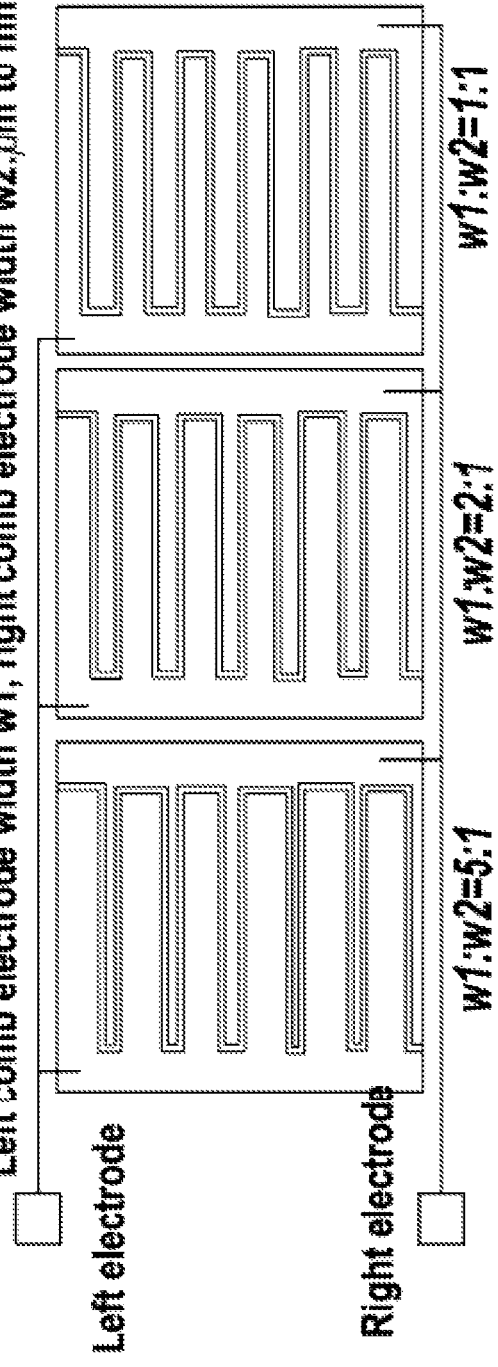
FIG. 9 shows a floor mat with IDT electrode design, with three different electrode width ratios shown.

Typical electrode layouts are shown in FIG. 9, with the left comb electrode width defined as w1, and right comb electrode width defined as w2 (both can be in μm to mm range). In this design, left electrodes from all the floor mats are connected together, and then right electrodes from all the floor mats are connected together, resulting in two electrodes in total for the whole floor mat system. By taking the voltage ratios, detection is independent of stepping force, speed, frequency, and so on. Consequently, the output ratio calculation has high robustness for position monitoring, in changing environments and with variations in the size and weight of the user. In theory, if the IDT pitch is small enough (i.e. the electrode width is small enough), voltage ratio detection is also independent of stepping position, direction, angle, etc. Furthermore, higher energy harvesting efficiency can be achieved with an IDT electrode portion design, when compared with a grid electrode portion design, since the whole surface covered with electrode patterns.

FIGS. 10a to 10c shows the voltage measurement results with 100 MΩ load under cotton sock stepping. It can be observed that the absolute magnitude of voltages increases with stepping force. However, the voltage ratios (V8 mm/V4 mm and V4 mm/V8 mm) stay within a similar level in terms of different forces (small, medium, large), frequencies (small, medium, large), positions (middle, front, back, left, right) and angles (front, front left, front right, left, right). The non-ideal or the variation of voltage ratio may be attributed to the relatively large electrode width adopted here and the irregular shape of human foot contacting area. When a small electrode width is used, the variations can be reduced.

FIGS. 10d to 10f show the voltages measurement results with 1 MΩ load under the same cotton sock stepping. A similar trend can be observed with the absolute magnitude in a smaller level due to lower load resistance. Voltage ratios (V8 mm/V4 mm and V4 mm/V8 mm) also stay within a similar level in terms of different forces, frequencies, positions and angles. Moreover, higher variation can be achieved in terms of V8 mm/V4 mm and V4 mm/V8 mm, meaning that higher detection accuracy of each unique floor mat can be achieved.

Figure 11A:
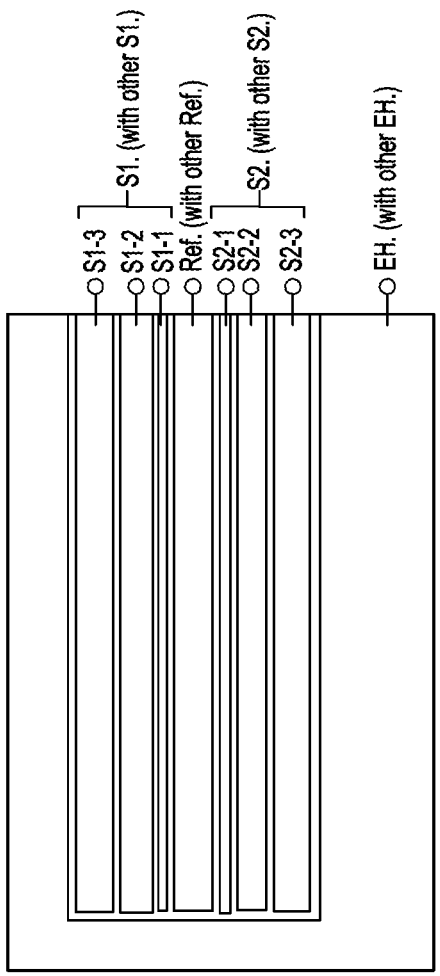
FIG. 11a illustrates a floor mat with coding electrode design.
Figure 12C:
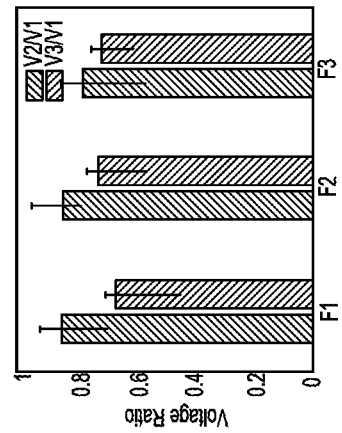
FIGS. 12a to 12i illustrate output performance of a fabricated floor mat with different sensing electrode connections (coding) under 100 MΩ load, with the connection schematic, voltage waveforms from all the electrodes, and voltage ratios of sensing electrodes to reference electrode for different coding of S1: S1-1; S2: S2-1 (FIGS. 12a to 12c), S1: S1-1+S1-2 (FIGS. 12d to 12f) and S2: S2-1+S2-2, and S1: S1-1+S1-2+S1-3 and S2: S2-1+S2-2+S2-3 (FIGS. 12g to 12i)
Figure 12B:
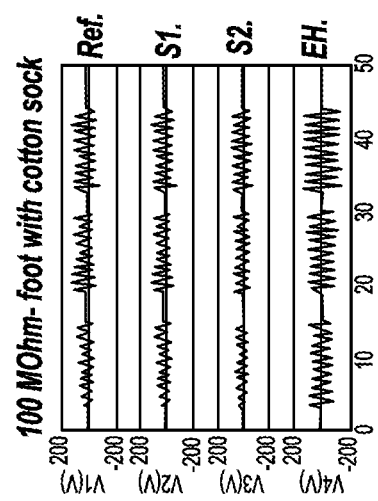
Figure 12A:
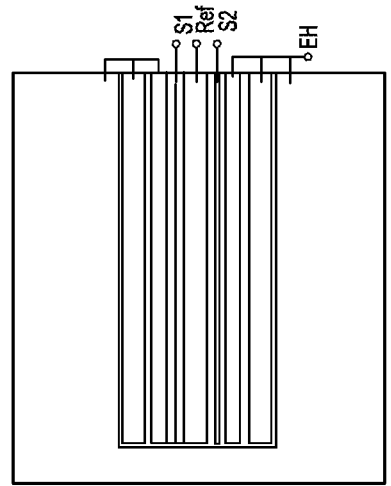
Figure 12F:
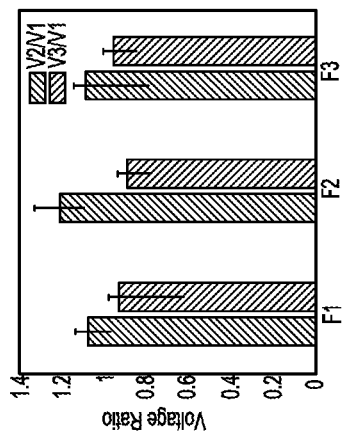
Figure 12E:
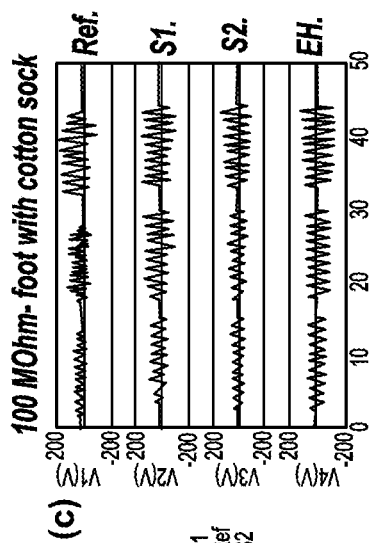
Figure 12D:
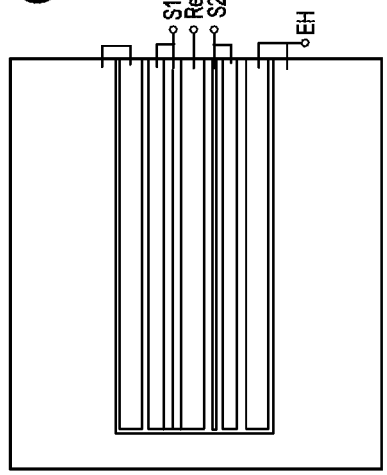
Figure 12I:
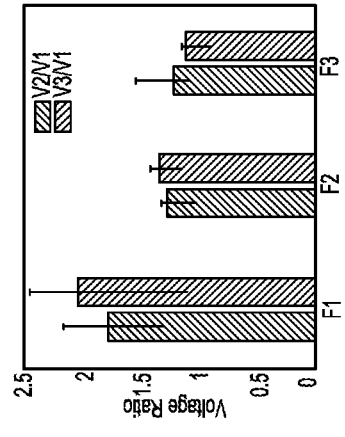
Figure 12H:
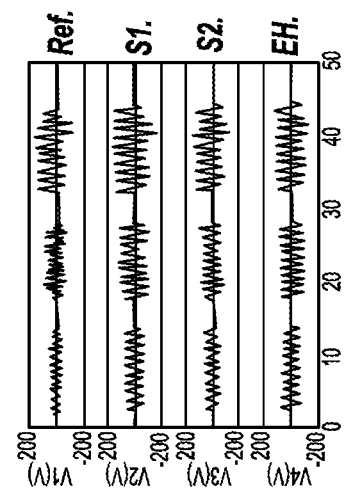
Figure 12G:
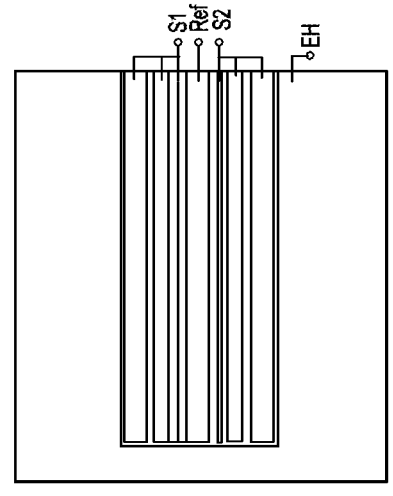

The coding electrode design has the same advantage of high robustness and reliability as the IDT electrode design, through the comparison of outputs from sensing electrodes to the reference electrodes. A typical electrode layout for coding electrode design is shown in FIG. 11a. Three types of electrodes are used for each floor mat and the whole floor mat system as well, i.e., a reference electrode, sensing electrode and energy harvesting electrode. Normally, only one reference electrode and energy harvesting electrode are needed, but the number of sensing electrodes can be varied depending on the required number of sensing pixels in the system. Each sensing electrode has three separated electrode patterns sitting side by side (S1-1, S1-2 and S1-3), with the width of first pattern S1-1 smaller than the reference electrode, the width of S1-1+S1-2 same as the reference electrode, and then the width of S1-1+S1-2+S1-3 larger than the reference electrode. The coding of each sensing electrode can be as such: 1) no pattern connected; 2) only S1-1 connected; 3) only S1-1 and S1-2 connected in parallel; 4) S1-1, S1-2 and S1-3 connected in parallel. These variations of coding will then produce no output signal, smaller output signal, similar output signal and larger output signal, respectively, in the sensing electrode S1 when compared to the reference electrode. By comparing the relative magnitude of sensing electrodes and reference electrode, position detection is independent of stepping force, speed, frequency, position, direction, angle, and so on, providing high robustness for position monitoring. If one sensing electrode is adopted, four independent floor mats can be achieved through electrode connection coding. If two sensing electrodes are adopted, 16 independent floor mats can be achieved through electrode connection coding. If three adopted, 64 independent floor mats etc. The electrode layout in FIG. 11a is the universal design for two sensing electrodes. Other than the position monitoring, the design of energy harvesting electrode provides extra advantage of continuous energy harvesting capability whenever there is person stepping on the floor mat system or other monitoring function such as pattern recognition except for position sensing.

FIG. 12 shows the output performance of a fabricated floor mat on a 100 MΩ load under cotton sock stepping, with different coding connections of the two sensing electrodes. The current electrode width dimensions are indicated in FIG. 12a. With the connection of S1: S1-1 and S2: S2-1 in FIGS. 12a to 12c, the outputs from both sensing electrodes are smaller than the reference electrode, with the ratio around the level of 0.8. With the connection of S1: S1-1+S1-2 and S2: S2-1+S2-2 in FIGS. 7d to 7f, the outputs from both sensing electrodes are similar to the reference electrode, with the ratio around the level of 1.

With the connection of S1: S1-1+S1-2+S1-3 and S2: S2-1+S2-2+S2-3 in FIG. 7g-i, the outputs from both sensing electrodes are larger than the reference electrode, with the ratio around the level of 1.2. The variation and the non-ideal relative magnitude are due to the large electrode width dimension adopted currently and the irregular shape of foot cannot evenly cover the whole reference and sensing electrode patterns. With the advanced fabrication technique and smaller electrode width for the next version, higher accuracy and less variation can be expected.

FIG. 13 shows the outputs of the same floor mat on a 1 MΩ load under flat shoe stepping, in order to reduce the variation caused by the large electrode width and irregular shape of human foot. With the connection of S1: S1-1 and S2: S2-1 in FIGS. 13a and 13b, the outputs from both sensing electrodes are smaller than the reference electrode more apparently, with the ratio around the level of 0.4. With the connection of S1: S1-1+S1-2 and S2: S2-1+S2-2 in FIGS. 13c and 13d, the outputs from both sensing electrodes are still similar to the reference electrode, with the ratio around the level of 1. With the connection of S1: S1-1+S1-2+S1-3 and S2: S2-1+S2-2+S2-3 in FIGS. 13e and 13f, the outputs from both sensing electrodes are larger than the reference electrode also more apparently, with the ratio around the level of 1.3. Although the variation of voltage ratios is higher due to the higher sensitivity of smaller load, the difference between the coding connections are also more obvious. Offering large error tolerance for different coding.

With the aforementioned three minimal electrode designs, the smart floor mat system can be equipped with diversified functionalities with system level integration. The basic function of the smart floor mat system is position mapping from self-generated and self-distinguishable triboelectric signals upon stepping by using minimal number of sensing electrodes. This function enables the smart floor mat system in the applications of smart home/building/hospital, smart sensing for automatic door/lighting/air-conditioner, activity monitoring such as walking/running/jumping, fall detection. The smart floor mat system can also be applied for harvesting energy from human performed activities upon it and storing the energy in an energy storage device. The stored energy can then be used as a power source for other sensors or electronics such as a temperature sensor, humidity sensor, $CO_2$ sensor, indoor lighting and so on, to further complement the realization of smart home. The smart floor mat system can be integrated with artificial intelligent technologies such as machine learning, to enable pattern recognition of different persons stepping on the sensory floor. With sufficient training, the dataset of walking patterns from persons who will normally walk on the floor mat system can be acquired. Then in a real application, if a person's walking pattern matches with the feature set derived from the training data, a security door will open automatically. If a person's walking pattern does not match with the feature set, then the security door will not open and an alarm signal can be sent—e.g. to a security guard. Using the pattern recognition capability, walking motions of multiple persons simultaneously on the floor mat system can also be detected potentially, if different generated peaks can be efficiently separated according to pattern recognition. The integrated system shows promising applications in security, multi-person monitoring, and so on. In addition, the smart floor mat system can be integrated with technologies in virtual reality/augmented reality (VR/AR) for interacting or controlling objects in virtual space, with potential applications in entertainment, gaming such as dancing mats, smart human-machine interfaces, and so on.

In summary, a smart floor monitoring system is developed for indoor positioning, activity monitoring, and individual recognition toward the smart building/home applications. In some embodiments, it is realized through the system integration of self-powered triboelectric DLES-mats and advanced DL-based data analytics. Benefited from screen printing manufacturing and triboelectric sensing mechanism, the DLES-mats are low cost, highly scalable, and self-sustaining, and are therefore ideal for large-area floor monitoring applications. In addition, the design of a distinct electrode pattern enables the interval parallel connection of different DLES-mats, resulting in minimal electrode output design with clear and stable differentiation for a 3×4 DLES-mat array and upwards (e.g. by repeating a pattern and shifting the digital twin along the floor system in virtual space, to detect when the digital twin is at the start of the next repetition of the pattern). Furthermore, after data analytics in the CNN model, a smart floor monitoring system can be achieved for real-time position sensing and identity recognition. The position sensing information from each step can be adopted to control lights and other devices in positions corresponding to the flooring segment on which the user is located, while the full walking signal can be analysed by the CNN model to predict whether the person is a valid user of the room so as to auto-control door access. Compared to camera and smart tag-based individual recognition, the smart floor monitoring systems disclosed herein use dynamic gait-induced output signals and provide a video-privacy-protected, highly convenient, and highly secure recognition method. For a 10-person CNN model with 1000 data samples, the average prediction accuracy can reach up to 96.00% based on specific walking gaits of individuals, offering high accuracy in practical, real-time scenarios.

Floor mat system for monitoring and energy harvesting purpose in various applications such as smart home/building, automatic access based on pattern recognition, fall detection, security, entertainment, etc.

This developed smart floor technology can establish the foundation using floor as the functional interface for diverse applications in smart building/home, e.g., intelligent automation, healthcare, and security.

It will be appreciated that many further modifications and permutations of various aspects of the described embodiments are possible. Accordingly, the described aspects are intended to embrace all such alterations, modifications, and variations that fall within the spirit and scope of the appended claims.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The invention claimed is:

1. A sensory floor comprising:
    a sensory flooring system comprising:
        a plurality of flooring segments; and
        for each flooring segment, one or more electrode portions each electrode portion being responsive to a force applied to the flooring segment,
        wherein at least one electrode portion of a said flooring segment forms an electrode with at least one electrode portion of another said flooring segment,
        wherein each flooring segment comprises a unique encoding of the one or more electrode portions; and
        wherein each electrode portion of each flooring segment is electrically connected with at least one electrode portion of another said flooring segment, to form an electrode;
    a receiver for receiving an electrical output from the one or more electrodes formed by said one or more electrode portions of the flooring segments; and
    a processor for analysing the electrical output and identifying the flooring segment by which the electrical output was produced, wherein the processor is configured to use a deep learning model to:
        sense a position of a user based on the electrical output; and
        detect a pattern of at least one of a magnitude of the electrical output and a sequence of flooring segments producing the electrical output, to identify a particular user as "valid" or "invalid" based on the pattern, the processor comprising a neural network configured to detect, based on features extracted from an output of each respective electrode, features corresponding to the particular user.

2. The sensory floor of claim 1, wherein electrode portions that are connected are of a common type.

3. The sensory floor of claim 2, wherein the common type comprises one or more of a pressure sensor and energy harvester.

4. The sensory floor of claim 2, wherein, for each common type, all electrode portions for all flooring segments are connected to form a single electrode.

5. The sensory floor of claim 1, wherein each flooring segment is uniquely encoded by the one or more electrode portions of each flooring segment covering a unique proportion of an area of the flooring segment.

6. The sensory floor of claim 5, wherein the unique proportion comprises a percentage of the area of the flooring segment.

7. The sensory floor of claim 5, wherein the proportion of the area of the flooring segment is randomly covered by the one or more electrode portions.

8. The sensory floor of claim 1, wherein each flooring segment is uniquely encoded by at least one of:

the one or more electrode portions of the flooring segment covering a unique proportion of an area of the flooring segment; and a material from which at least one of the electrode portions of the flooring segment differing from a material of at least one of the electrode portions of another flooring segment.

9. The sensory floor of claim 1, wherein each flooring segment comprises two or more electrode portions and is uniquely encoded by having a specific ratio of power outputs of the two or more electrode portions when a force is applied to the flooring segment.

10. The sensory floor of claim 9, wherein each flooring segment comprises two electrode portions.

11. The sensory floor of claim 9, wherein the electrode portions of each flooring segment are interdigital or interdigitated.

12. The sensory floor of claim 9, wherein a width of the two or more electrode portions is selected to optimize consistency of the specific ratio.

13. The sensory floor of claim 9, wherein the two or more electrode portions are sensing electrode portions.

14. The sensory floor of claim 1, wherein each flooring segment comprises at least one sensing electrode portion and at least one reference electrode portion, and is uniquely encoded by a specific ratio of a power output of the at least one sensing electrode portion when compared with a power output of the at least one reference electrode portion, on application of a force to the flooring segment.

15. The sensory floor of claim 14, wherein the at least one sensing electrode portion comprises a first sensor having two or more sensing electrode portions and, for each flooring segment, a different combination of the two or more sensing electrode portions is electrically connected, and electrode portions that are not electrically connected are redundant.

16. The sensory floor of claim 14, wherein the at least one sensing electrode portion comprises a first sensor and a second sensor each said sensor comprising one or more sensing electrode portions and, for each flooring segment, a different combination of two or more sensing electrode portions is electrically connected, and electrode portions that are not electrically connected are redundant.

17. The sensory floor of claim 1, wherein each flooring segment further comprises at least one energy harvesting electrode.

18. The sensory floor of claim 1, further comprising at least one environment sensor for determining at least one environmental condition around the sensory floor, wherein the processor is configured to adjust analysis of the electrical output based on a signal from the at least one environment sensor.

19. The sensory floor of claim 1, wherein the neural network is trained based on data obtained from a plurality of trials in which one or more people cross the sensory floor.

20. The sensory floor of claim 1, wherein the processor is configured to identify, from a magnitude of the electrical output, a particular position of a person on the sensory floor.

* * * * *